US012029213B2

(12) United States Patent
Surratt

(10) Patent No.: US 12,029,213 B2
(45) Date of Patent: Jul. 9, 2024

(54) PACK BAG FOR TRANSPORTING AT LEAST A HEAD PORTION OF AN ANTLERED BIG-GAME ANIMAL

(71) Applicant: Trophy Addict LLC, Wallsburg, UT (US)

(72) Inventor: Nathan Surratt, Wallsburg, UT (US)

(73) Assignee: Trophy Addict LLC, Wallsburg, UT (US)

( * ) Notice: Subject to any disclaimer, the term of this patent is extended or adjusted under 35 U.S.C. 154(b) by 107 days.

(21) Appl. No.: 17/404,064

(22) Filed: Aug. 17, 2021

(65) Prior Publication Data

US 2022/0061308 A1 Mar. 3, 2022

Related U.S. Application Data

(60) Provisional application No. 63/070,143, filed on Aug. 25, 2020.

(51) Int. Cl.
*A01M 31/00* (2006.01)
(52) U.S. Cl.
CPC ................ *A01M 31/006* (2013.01)
(58) Field of Classification Search
CPC .................................................. A01M 31/006
See application file for complete search history.

(56) References Cited

U.S. PATENT DOCUMENTS

| | | | | |
|---|---|---|---|---|
| 6,253,569 | B1* | 7/2001 | Hall | F25D 3/08 |
| | | | | 62/457.2 |
| 6,510,705 | B1* | 1/2003 | Jackson | B65D 81/3813 |
| | | | | 62/457.2 |
| 9,181,022 | B2* | 11/2015 | Armstrong | A45C 5/00 |
| 2007/0022775 | A1* | 2/2007 | Bernhard, Jr. | F25D 3/08 |
| | | | | 62/457.2 |
| 2007/0236000 | A1* | 10/2007 | Small | B62B 15/00 |
| | | | | 280/845 |
| 2012/0145720 | A1* | 6/2012 | Hicks | A45C 3/00 |
| | | | | 220/592.2 |
| 2014/0166714 | A1* | 6/2014 | Peisley | A45F 3/04 |
| | | | | 53/469 |
| 2021/0093905 | A1* | 4/2021 | Kushniruk | A62B 35/0006 |
| 2021/0321604 | A1* | 10/2021 | Hall | A01M 31/006 |

* cited by examiner

*Primary Examiner* — Derek J Battisti
(74) *Attorney, Agent, or Firm* — Keller Preece PLLC

(57) ABSTRACT

The present disclosure relates to a pack bag for transporting at least a head portion of an antlered big-game animal. The pack bag comprises foldable flaps defining an opening for inserting the antlered big-game animal head into the pack bag. Upon insertion, a bottom flap can extend from the opening and at least partially fold onto itself (e.g., to cover hide attached to the head portion). In addition, a top flap opposite the bottom flap can extend from the opening and pass between antlers and over the at least partially folded bottom flap. A fastener connected to at least one of the top or bottom flaps can then compress the top and bottom flaps against the antlered big-game animal head. Additionally, the pack bag is attachable to a backpack, saddle, or other carrying apparatus (e.g., via a loop, eyelet, etc. provided on an outer surface of the pack bag).

20 Claims, 24 Drawing Sheets

PACK BAG FOR TRANSPORTING AT LEAST A HEAD PORTION OF AN ANTLERED BIG-GAME ANIMAL

CROSS-REFERENCE TO RELATED APPLICATIONS

The present application claims the benefit of U.S. Provisional Application No. 63/070,143, filed on Aug. 25, 2020. The aforementioned provisional application is hereby incorporated by reference in its entirety.

BACKGROUND

When hunting, much of the work occurs after harvesting a big-game animal. For example, hunters will often field-dress the big-game animal to prevent spoilage of the meat. Once field-dressed, the arduous task of transporting the big-game animal from the field begins. In many cases, dragging the big-game animal is not an option either due to the weight of the big-game animal and/or the distance or terrain. In addition, dragging the big-game animal can dirty the meat, ruin the hide, or cause other issues. Thus, many hunters will, at the point of harvest, break down or segment the big-game animal into quarters (e.g., two front and two hind quarters) for more clean, efficient transportation of the big-game animal. Conventional game bags exist for hunters to place the quarters inside the game bags to keep the meat clean and fresh. Such conventional game bags are shaped similar to a laundry bag, a pillowcase, or a trash bag. With application of some materials, conventional game bags in certain cases can also reduce blood leakage from the meat onto a hunter's backpack or clothing.

Although, conventional game bags exist for transporting the meat of a big-game animal as just described, a need however exists for transporting at least the head of an antlered big-game animal. Because antlers do not typically fit inside a backpack or conventional game bags, most hunters will tie the head and/or antlers of an antlered big-game animal to an outside surface of a backpack. Depending on the amount of available rope/ties and the weight of the head and antlers, securing the big-game animal head to a backpack can be a difficult task. Particularly for larger big-game animals like elk or moose, lashings are often prone to fail during transport causing damage to the big-game animal head or injury to the hunter. For these reasons, some hunters carry the head of a big-game animal by itself (e.g., like a backpack by placing the antlers over the shoulders). These and other methods to transport an antlered big-game animal head are inefficient, difficult, messy (resulting in the transfer of significant fluids to the hunter's backpack and clothes), and potentially dangerous.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Aspects of the present disclosure relate to a pack bag for transporting at least a head portion of an antlered big-game animal. The pack bag comprises foldable flaps defining an opening for inserting the head portion of the antlered big-game animal into the pack bag. Past the opening, sidewalls of the pack bag (and/or the foldable flaps extend to) define a receptacle sized and shaped to receive an inserted head portion of the antlered big-game animal, such as the nose, upper and lower jaws, eyes, and/or other head and face portions. Once the head portion of the antlered big-game animal is fully inserted into the receptacle of the pack bag, one or both of the foldable flaps can at least partially enclose the opening. To illustrate, a first top flap in some embodiments extends from the opening and at least partially folds onto itself (e.g., to cover hide attached to the head portion). In addition, a second bottom flap opposite the first top flap extends from the opening and passes between antlers and over the at least partially folded first top flap. With the second bottom flap overlapping the first top flap, a fastener associated with one or both of the first and second flaps can secure the first and second flaps in place and the antlered big-game animal head inside the pack bag. The pack bag can then attach to a backpack, saddle, pack animal, field vehicle, or other carrying apparatus (e.g., via one or more loops, eyelets, or other securing mechanisms provided on an outer surface of the pack bag).

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
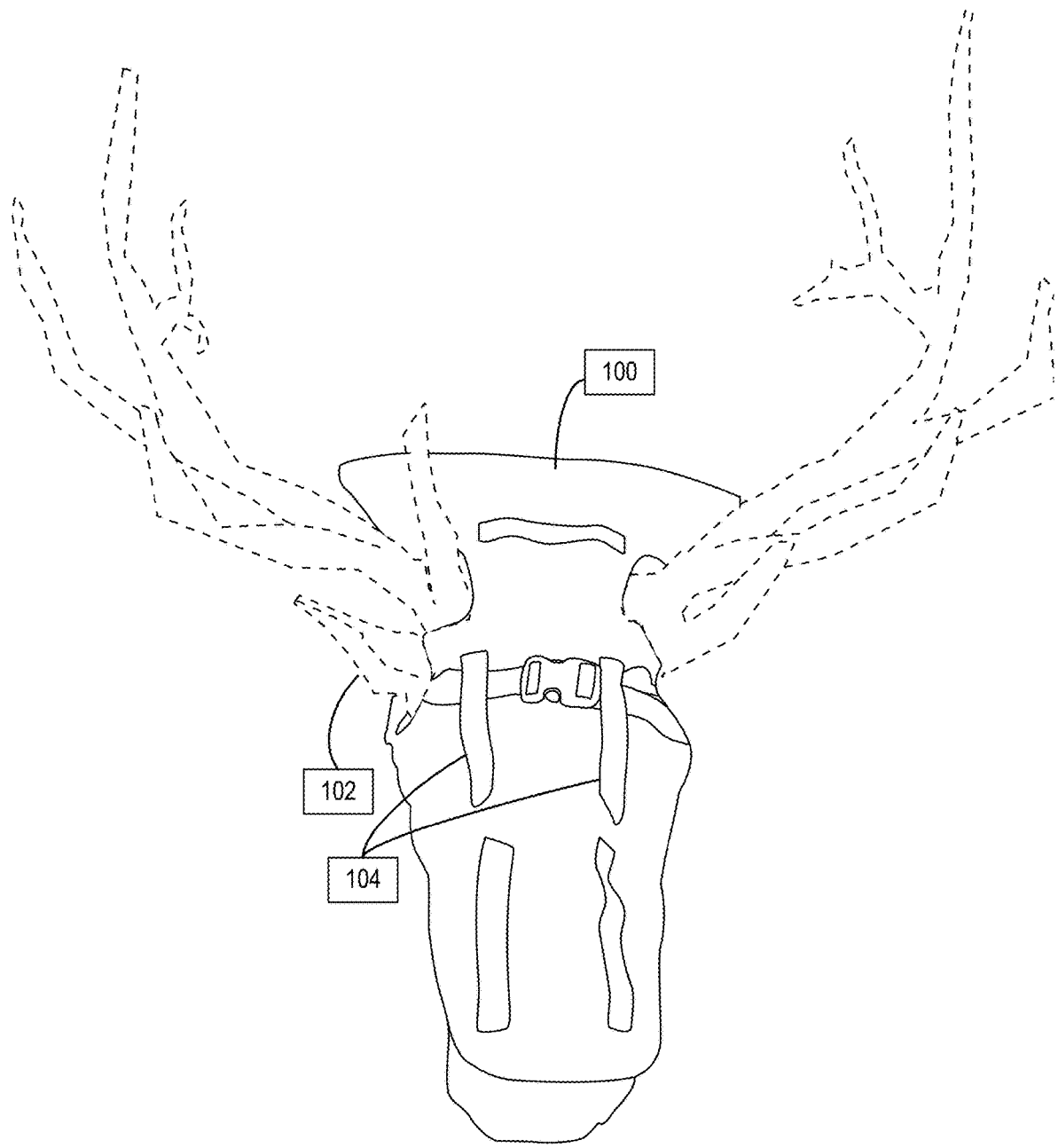
FIG. 1 illustrates an example environment for implementing a pack bag in accordance with one or more embodiments.

This disclosure describes one or more embodiments of a pack bag for integrating with a backpack (or other carrying apparatus) to transport a head portion of an antlered big-game animal. In particular, the pack bag is sized and shaped to help transport an antlered big-game animal head after the point of harvest in a more safe, efficient, clean, and convenient manner. For example, the pack bag can fit the head and a caped portion of a variety of different antlered big-game animals, such as a bull elk, a buck deer, a bull moose, a caribou, a buffalo, a ram sheep, etc. To illustrate, the pack bag may include a fitted nose sleeve tailored to fit at least the nose of an antlered big-game animal. In some embodiments, the fitted nose sleeve slides past the nose of the antlered big-game animal head and additionally covers a face portion of the antlered big-game animal head. Connected to the fitted nose sleeve, the pack bag can include first and second pack tails (or flaps). The first and second pack tails (or flaps) are sized and shape to provide various wrap configurations around the antlered big-game animal head. In a wrapped configuration, the first and second pack tails help secure at least the nose of the antlered big-game animal head to remain inside the fitted nose sleeve. Additionally, in a wrapped configuration, the antlered big-game animal head is ready for transport by cinching external backpack straps through security loops on the first or second pack tails and/or the fitted nose sleeve of the pack bag.

As just mentioned, the pack bag can mount an antlered big-game animal head to a backpack, saddle, off-road vehicle, or other carrying apparatus for more effective transportation. To do so, the pack bag comprises various components that protect or cover various portions of the antlered big-game animal head. Additionally or alternatively, the pack bag comprises various components that support and/or secure the antlered big-game animal head by providing a weight-distribution effect.

For example, in some embodiments, the pack bag comprises a fitted nose sleeve to catch and hold a nose portion of the antlered big-game animal. The fitted nose sleeve comprises a nose-abutment wall (or web), top and bottom faces, and sidewalls. The nose-abutment wall engages or supports the nose-end portion of the antlered big-game animal when inserted into the pack bag. From the nose-abutment wall, the top and bottom faces and the sidewalls extend perpendicular to the nose-abutment wall to at least partially enclose a portion (e.g., an adjustable portion) of the antlered big-game animal head. For instance, in some embodiments, the fitted nose sleeve is sized and shaped specific to the antlered big-game animal such that the fitted nose sleeve covers a predetermined amount of the antlered big-game animal head (e.g., up to a base of the antlers). Additionally or alternatively, the fitted nose sleeve is sized and shaped for a variety of antlered big-game animals such that the fitted nose sleeve can cover an adjustable amount of the antlered big-game animal head.

In addition, the pack bag comprises first and second pack tails connected to the fitted nose sleeve. For example, the first and second pack tails (e.g., in a flat or unfolded configuration) extend from where the sidewalls of the fitted nose sleeve end in a manner parallel to the respective top and bottom faces of the fitted nose sleeve and directionally away from the nose-abutment wall. In some embodiments, the first pack tail and the top face of the fitted nose sleeve are formed of a continuous piece of material. Likewise, in some implementations, the second pack tail and the bottom face of the fitted nose sleeve are formed of a continuous piece of material. In other embodiments however, the first pack tail and the top face of the fitted nose sleeve are joined separate pieces of material. Similarly, the second pack tail and the bottom face of the fitted nose sleeve in some implementations are joined separate pieces of material.

In these or other embodiments, the first and second pack tails interact with each other to secure the antlered big-game animal inside the pack bag. For example, one or both of the first and second pack tails can, independent of each other, wrap around an antlered big-game animal head to cover portions not covered by the fitted nose sleeve. In a variety of potential wrap configurations, the first and second pack tails can increase a surface area coverage over the antlered big-game animal head and/or overlap to better distribute payload stresses. In at least one wrap configuration, one or both of the first and second pack tails wrap or otherwise cover a caped portion of the big game animal head. Additionally or alternatively, in at least one wrap configuration, one or both of the first and second pack tails pass between antler bases (e.g., for improved stability of the antlered big-game animal head within the pack bag). In these or other embodiments, at least one of the first or second pack tails includes a pair of edges each defining a cutout sized and shaped to fit at least partially around opposing antler bases.

In addition, the pack bag comprises one or more fasteners and loops. For example, one or both of the first or second pack tails comprise a male and female buckle mechanism attached to straps for cinching down a wrap configuration of the first and second pack tails. To illustrate, respective straps with the male and female buckle mechanisms can wrap (in opposite directions) from a first side of the antlered big-game animal head to an opposing second side where the male and female buckle mechanisms mate. Further, the straps can thread through one or more loops disposed on the fitted nose sleeve or the first or second pack tails such that the straps are prevented from sliding. By positionally constraining the straps, the loops help the straps maintain compression around the pack bag for a tight, secure fit around the antlered big-game animal head after the male and female buckle mechanisms are mated and the straps tightened. A variety of fasteners can be utilized, such as a cinch fastener, a tie fastener, a wench fastener, or a Velcro® fastener.

As another example, the pack bag comprises fasteners to secure at least one of the first or second pack tails to the respective antler bases of the antlered big-game animal head. For instance, mating buckle mechanisms can secure antler bases within edge cutouts of the first or second pack tails to provide a more tight, secure fit to the antlered big-game animal head and/or better distribute material stresses.

In some implementations, at least one of the first or second pack tail comprises additional or alternative materials compared to the fitted nose sleeve. For example, the first or second pack tail can include a reinforced portion (e.g., a puncture-resistant portion to cover eyeguards or other antler features at a base of the antlers). As another example, one or more of the fitted nose sleeve or the first or second pack tails can include a fluid-resistant material or coating (e.g., to reduce blood seepage through the pack bag). In yet another example, the fitted nose sleeve and/or one of first or second pack tails may include a material with increased visibility for safety purposes (e.g., a reflective material/coating, a blaze orange or other colored material, etc.).

Turning to the figures, FIG. 1 illustrates an example environment for implementing a pack bag 100 in accordance with one or more embodiments. As shown, the pack bag 100 encloses an antlered big-game animal head 102 secured inside the pack bag 100 for transportation. In particular, the pack bag 100 is mountable to a backpack or other carrying apparatus by engaging loops 104 of the pack bag 100. Thus, unlike conventional methods mentioned above, the pack bag 100 can mount the antlered big-game animal head 102 to a backpack in a clean, efficient, safe, and secure manner.

Figure 2:
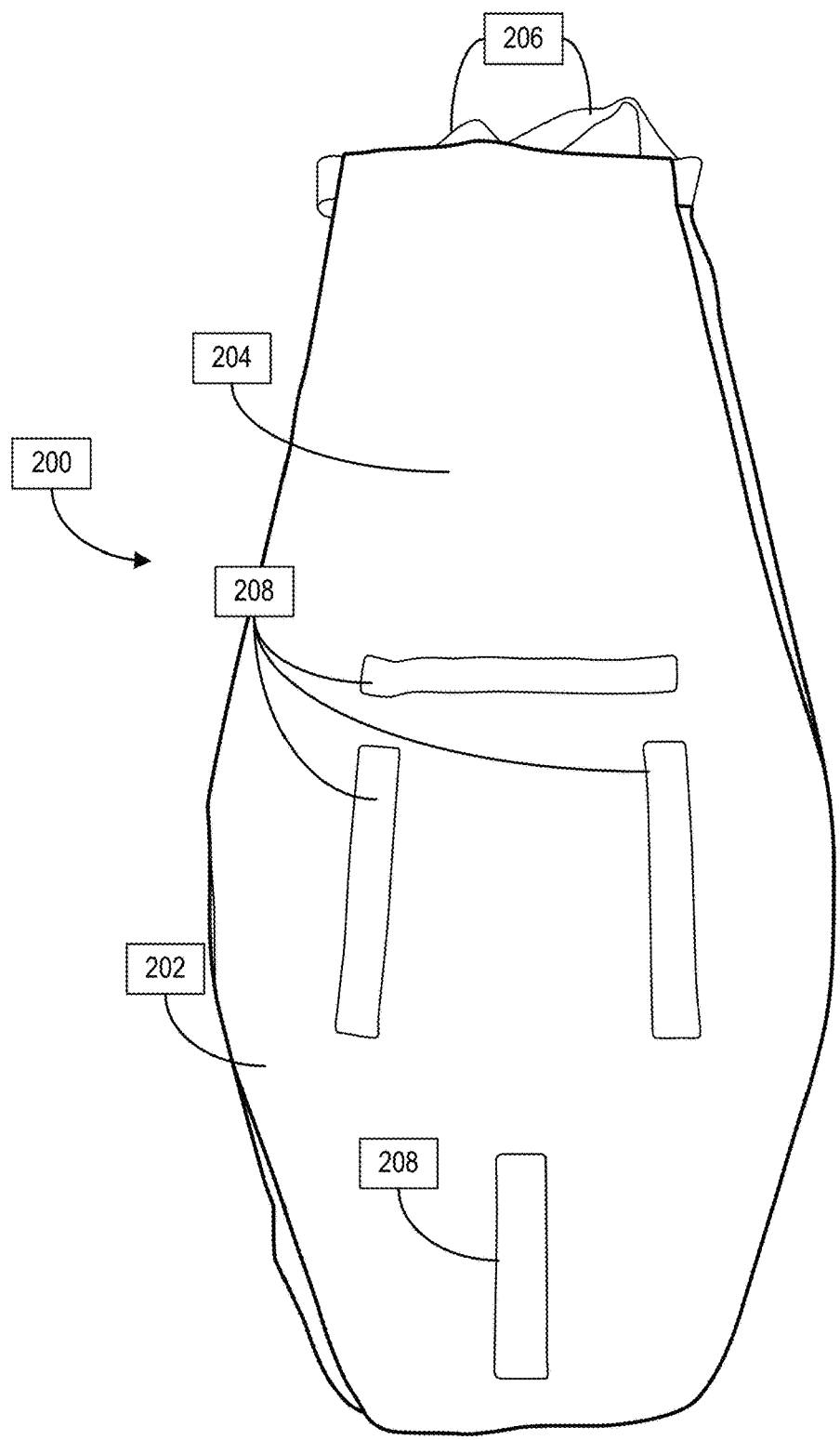
FIG. 2 illustrates a top perspective view of a pack bag in accordance with one or more embodiments.

FIG. 2 illustrates a top perspective view of a pack bag 200 in accordance with one or more embodiments. As shown in FIG. 2, the pack bag 200 comprises a nose enclosure 202, a first top flap 204, a second bottom flap (not shown), fasteners 206, and loops 208. In particular, the nose enclosure 202 is sized and shaped to receive a nose-end portion of an antlered big-game animal head. For instance, the nose enclosure 202 tapers from a wider portion to a narrower portion to provide a tighter fit around the nose-end portion of the antlered big-game animal head.

In addition, the first top flap 204 spans a length from the nose enclosure 202 to the fasteners 206. In particular, a first segment of the first top flap 204 can extend from the nose enclosure 202 and pass between antler bases of the antlered big-game animal head. After the first segment of the first top flap 204 passes between a first antler base and a second antler base, a second (contiguous) segment of the first top flap 204 extends to at least partially cover the second bottom flap at an underside portion of the antlered big-game animal head. In turn, the fasteners 206 can secure the wrap configuration by extending around the antlered big-game animal head from the underside portion to the topside portion and then connecting together through one or more of the loops 208.

The first top flap 204 can provide myriad other wrap configurations around the antlered big-game animal head. For example, the first top flap 204 can extend between the first and second antler bases and subsequently wrap around at least one of the first or second antler bases to double back over the first top flap 204 towards the nose enclosure 202. As another example, the first top flap 204 can extend between the first and second antler bases, across a length of the underside portion until wrapping around and overlapping the nose enclosure 202 on the topside. In other embodiments, the second bottom flap extends between the first and second antler bases (rather than the first top flap 204). In these or other embodiments, the fasteners 206 thread through the loops 208 to secure the myriad different wrap configurations contemplated within the present disclosure. Accordingly, the pack bag 200 comprises more or fewer of the fasteners 206 and/or the loops 208 in some embodiments. Likewise, the pack bag 200 comprises additional or alternative positional configurations of the fasteners 206 and/or the loops 208 than shown in FIG. 2.

In these or other embodiments, the pack bag 200 comprises a canvas or other heavy-duty, washable material for continued re-use. Additionally, in some embodiments, at least the material for the nose enclosure 202 and/or the first top flap 204 comprises a visibility design scheme. For example, to increase visibility, the nose enclosure 202 and/or the first top flap 204 comprise portions of a blaze orange color, a blaze pink color, etc. Additionally or alternatively, portions of the nose enclosure 202 and/or the first top flap 204 may include a camouflaged design. Of course, the backside of the pack bag 200 described further below can include the same or similar design features just mentioned.

Figure 3:
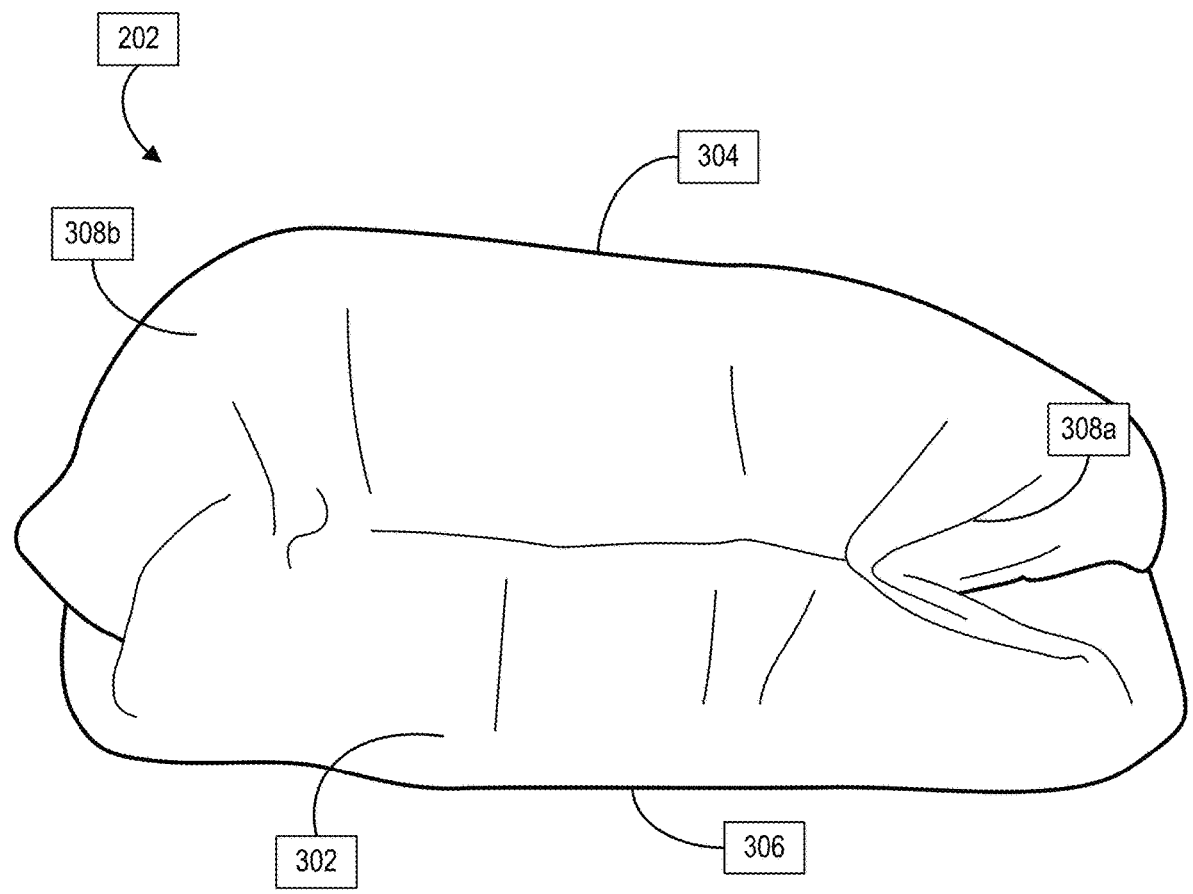
FIG. 3 illustrates a front view of a pack bag in accordance with one or more embodiments.

FIG. 3 illustrates a front view of the pack bag 200 in accordance with one or more embodiments. As shown, the nose enclosure 202 comprises a nose-end web 302, a top face 304, a bottom face 306, and sidewall edges 308a, 308b. The nose-end web 302 is configured to abut (e.g., support, rest against) a nose-end portion of an antlered big-game animal head. Accordingly, the nose-end web 302 in some embodiments is at least partially weight-bearing when the pack bag 200 is in transport with the antlered big-game animal head.

Figure 9:
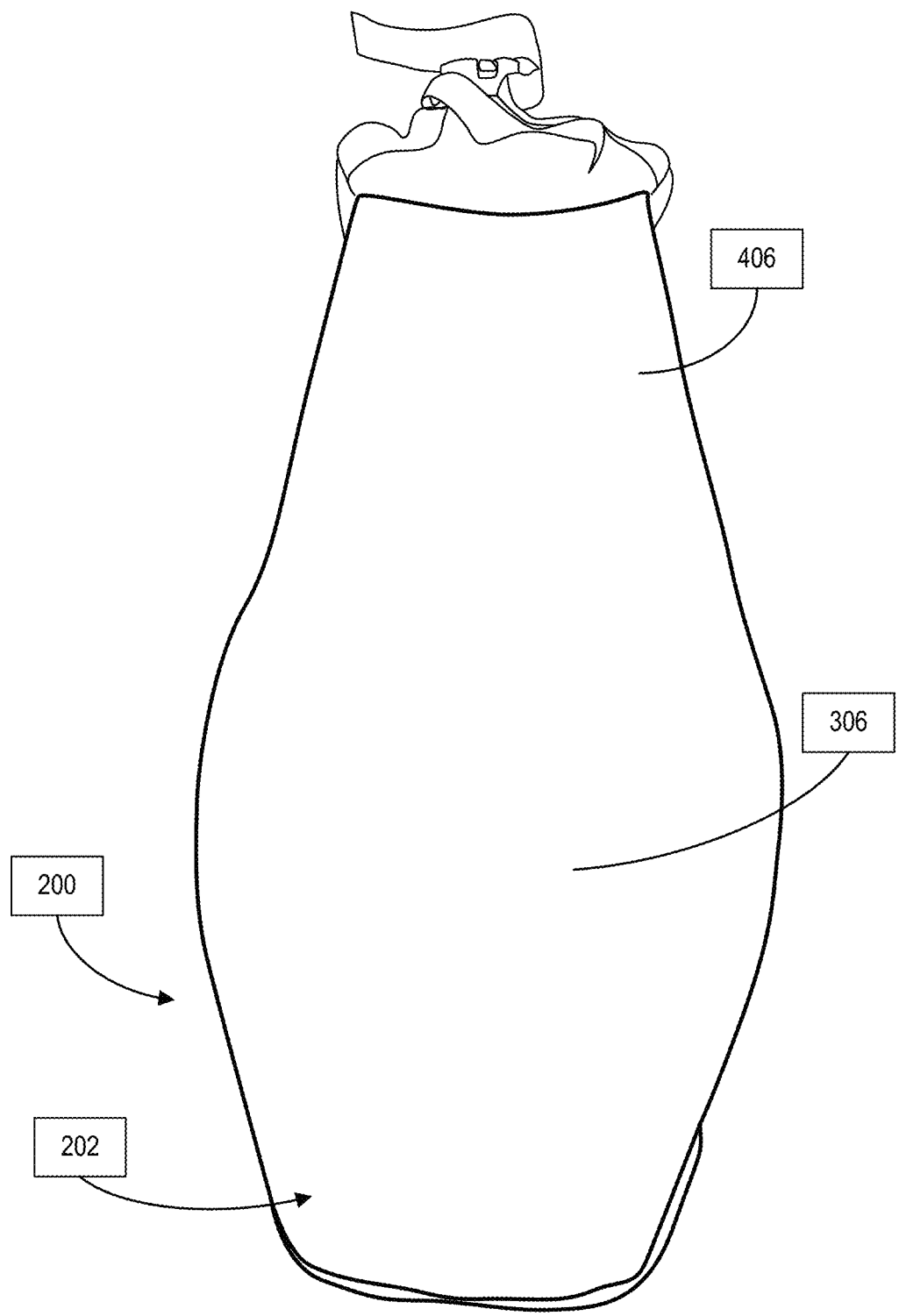
FIG. 9 illustrates a bottom view of a pack bag in accordance with one or more embodiments.

Additionally shown, the nose-end web 302 spans a depth between the top face 304 and the bottom face 306 and a width between the sidewall edges 308a, 308b. The top face 304 comprises a top portion of the pack bag 200 and includes one or more of the loops 208 shown in FIG. 2. The bottom face 306 comprises a bottom portion of the pack bag 200 as shown in FIG. 9. Moreover, it will be appreciated that the term "face" (e.g., in connection with the top face 304 and the bottom face 306) is not limited to flat surfaces. Indeed, the top face 304 and the bottom face 306 can include a variety of different surface types—including curved surfaces, non-uniform surfaces, or foldable (e.g., adaptive or non-rigid) surfaces. The sidewall edges 308a, 308b comprise an edge portion of sidewalls of the pack bag 200 as discussed further below in relation to FIG. 4.

In an alternative embodiment to the nose enclosure 202 of FIG. 3, the pack bag 200 comprises an open-ended nose enclosure such that the nose-end web 302 is removed. For example, the nose-end portion of the antlered big-game animal head may protrude outwardly from between the sidewall edges 308a, 308b. Allowing part of the nose-end portion of the antlered big-game animal head to remain outside of the pack bag 200 may be advantageous in some embodiments. For example, in some cases, an opening in place of or within the nose-end web 302 allows the pack bag 200 to provide a controlled drainage of blood or other fluids that may otherwise accumulate in the nose enclosure 202. As another example, blood may drain outside the pack bag 200 directly from the nose or mouth of the antlered big-game animal head. In these or other embodiments, the nose enclosure 202 may include an increasingly tapered shape, a draw string, additional fasteners, etc. to secure or wedge the nose-end portion of the antlered big-game animal head against one or more of the sidewall edges 308a, 308b, the top face 304, or the bottom face 306.

Figure 4:
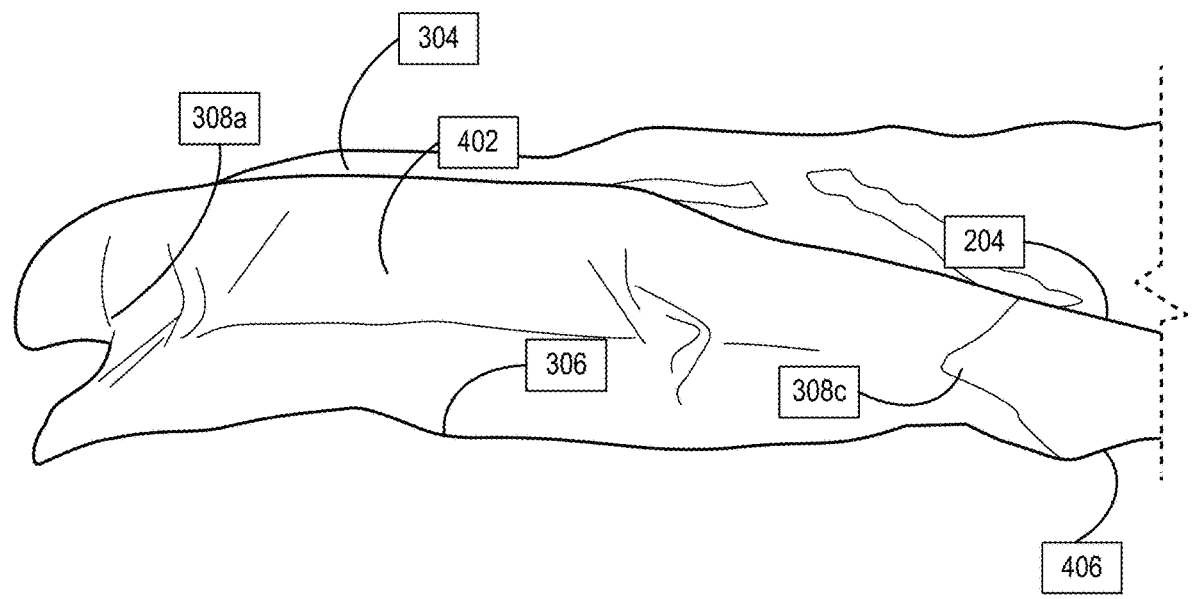
FIG. 4 illustrates a side perspective view of a pack bag in accordance with one or more embodiments.

FIG. 4 illustrates a side perspective view of the pack bag 200 in accordance with one or more embodiments. As shown in FIG. 4, the pack bag 200 comprises a sidewall 402 that partially joins the top face 304 and the bottom face 306 of the nose enclosure 202. In particular, the sidewall 402 spans a length between sidewall edges 308a, 308c and a depth between the top face 304 and the bottom face 306.

Additionally shown in FIG. 4, the pack bag 200 comprises the first top flap 204 (described above in relation to FIG. 1) and a second bottom flap 406 (described more below in relation to the following figures). In some embodiments, the sidewall edge 308c (and an opposing sidewall edge not shown) is a referenced boundary and not a physical boundary between the nose enclosure 202 and both of the first top flap 204 and the second bottom flap 406. For example, in the embodiment shown in FIG. 4, the first top flap 204 forms a continuous piece of material with the top face 304 of the nose enclosure 202. Likewise, the second bottom flap 406 forms a continuous piece of material with the bottom face 306 of the nose enclosure 202. In other embodiments not shown, the sidewall edge 308c is a physical boundary where the pack bag 200 comprises a physical joint (e.g., a stitching) that combines two separate pieces of material where respective faces of the nose enclosure 202 join with the first top flap 204 and the second bottom flap 406.

Figure 5:
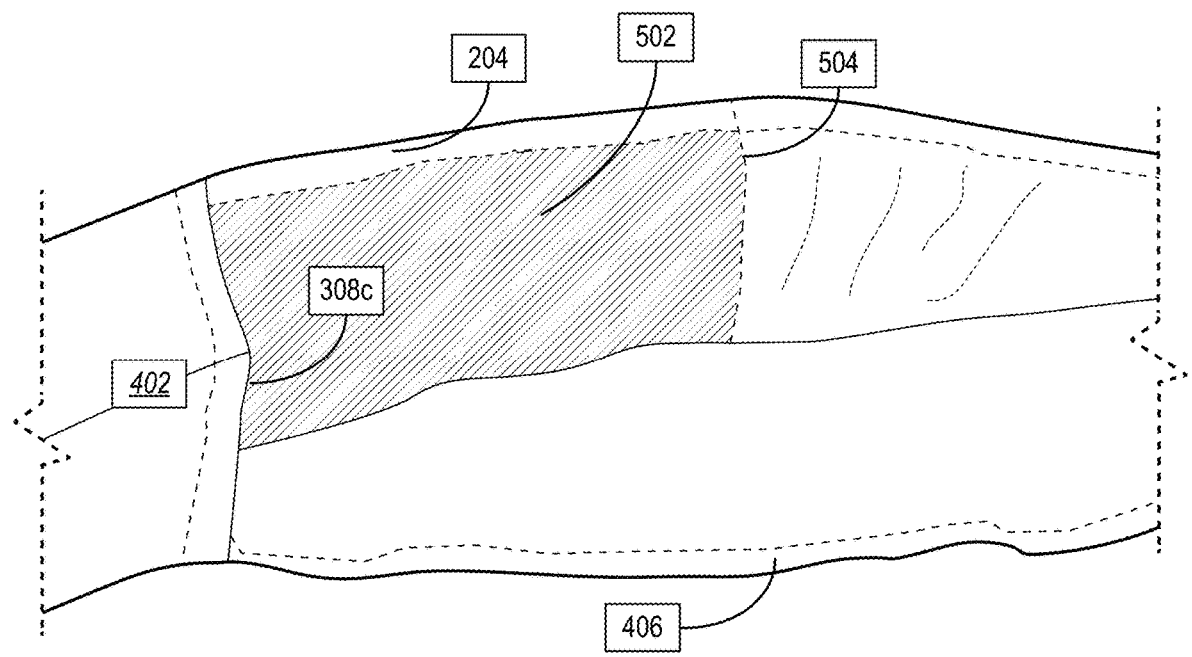
FIG. 5 illustrates another side perspective view of a pack bag in accordance with one or more embodiments.

FIG. 5 illustrates another side perspective view of the pack bag 200 in accordance with one or more embodiments. As shown in FIG. 5, the pack bag 200 comprises a reinforcement portion 502 positionally located on the first top flap 204 from about the sidewall edge 308c to an upper bound 504 (e.g., a stitching, an insert liner, etc.). Of course, other positions of the reinforcement portion 502 are within the scope of the present disclosure (e.g., to accommodate different species of antlered big-game animals). In these or other embodiments, the reinforcement portion 502 is a puncture-resistant material configured to withstand pressure points from eyeguards or other sharp or rough antler features. For example, the reinforcement portion 502 can comprise a heavy-duty nylon material, a ripstop material, etc. that differs from the rest of the pack bag 200. As another example, the reinforcement portion 502 can comprise one or more additional layers of a same material as the rest of the pack bag 200 (e.g., a canvas material).

Figure 6:
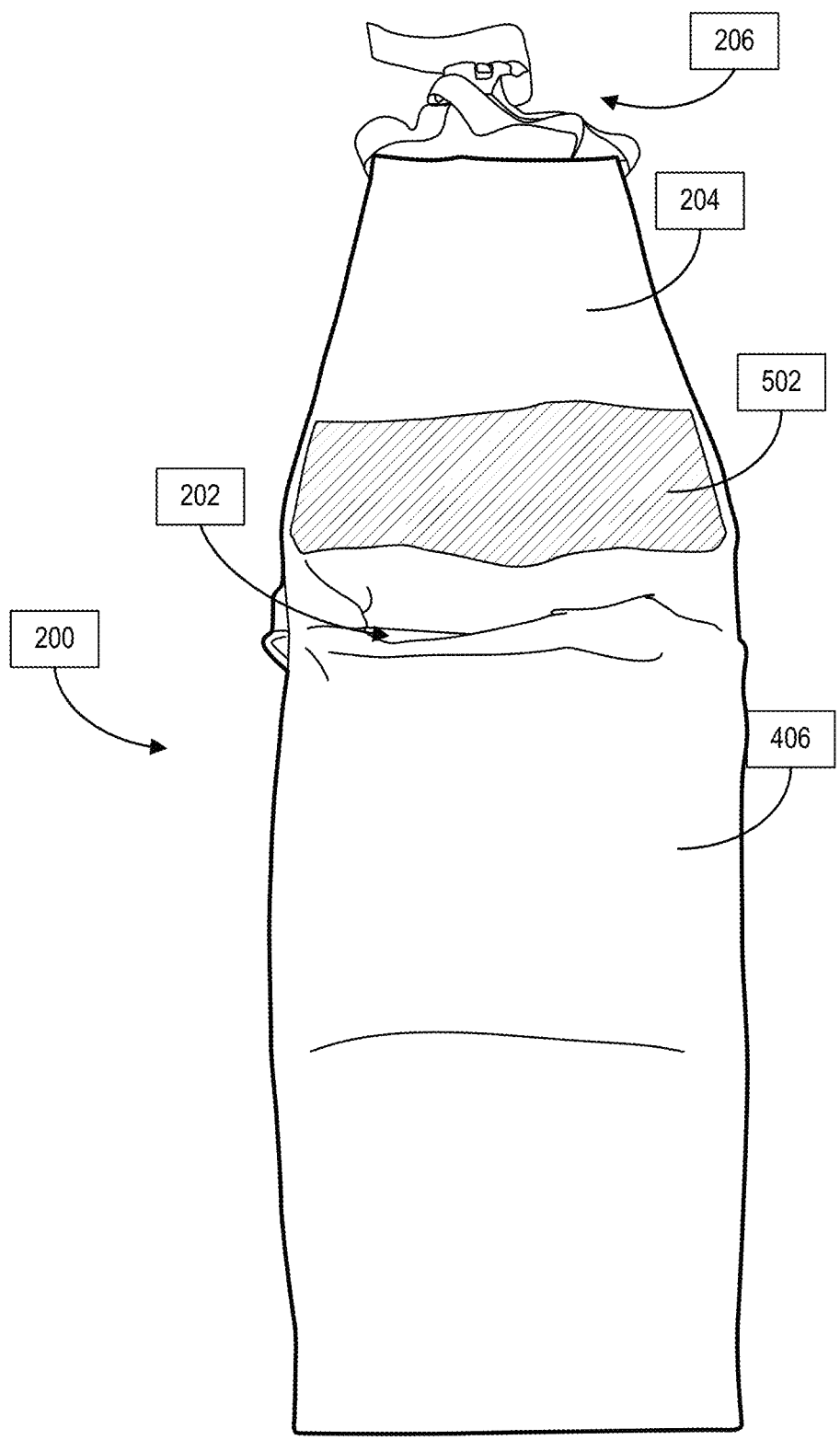
FIGS. 6-7 illustrate open views of a pack bag in accordance with one or more embodiments.
Figure 7:
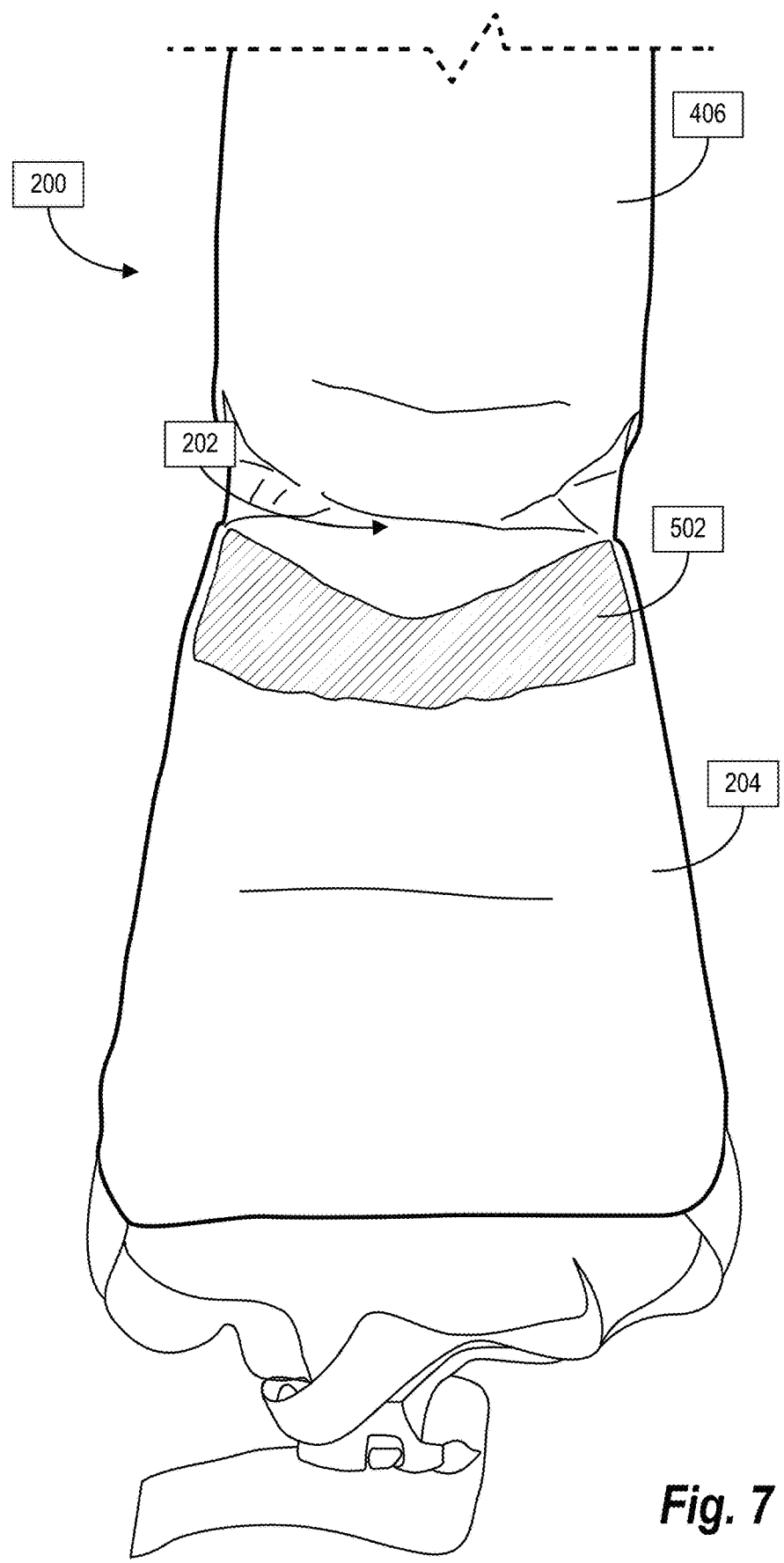

FIGS. 6-7 illustrate open views of the pack bag 200 in accordance with one or more embodiments. As shown in FIGS. 6-7, the pack bag 200 is laid out such that the first top flap 204 and the second bottom flap 406 are pulled apart to show internal surfaces of the pack bag 200 and the opening into the nose enclosure 202. In these or other embodiments, the second bottom flap 406 can, similar to the first top flap 204, provide a variety of wrap configurations around the antlered big-game animal head and/or around a caped portion comprising hide attached to the antlered big-game animal head. For example, in at least one wrap configuration (e.g., as described more below in relation to FIGS. 11A-11H) the second bottom flap 406 can wrap up a caped portion of the antlered big-game animal head. In another example wrap configuration (e.g., in which the antlered big-game animal head comprises no caped portion), the second bottom flap 406 passes between antler bases and overlaps either over or underneath the first top flap 204.

To facilitate these and/or myriad other wrap configurations of the second bottom flap 406 around the antlered big-game animal head, the second bottom flap 406 can also include (albeit not shown) one or more fasteners. The fasteners may be the same as or similar to the fasteners 206. Accordingly, such fasteners on the second bottom flap 406 may, in addition to alternatively to the fasteners 206, engage the loops 208 described above in relation to FIG. 2 (e.g., to secure the respective wrap configurations of the first top flap 204 and the second bottom flap 406). Alternatively, such fasteners on the second bottom flap 406 may in addition to alternatively to the fasteners 206, engage loops, eyelets, or other securing mechanisms that may be provided on the outer surface of the second bottom flap 406 and/or the bottom face 306 (albeit none are shown in FIG. 9).

Additionally, in some embodiments, one or more portions of the first top flap 204, the second bottom flap 406, and/or the nose enclosure 202 may include water-resistant materials, water-proof materials, and/or applied coatings. By including water-resistant materials, water-proof materials, and/or applied coatings (e.g., to internal surfaces of the first top flap 204, the second bottom flap 406, and/or the nose enclosure 202), the pack bag 200 can reduce an amount of blood seepage through the pack bag 200 onto external gear or clothing.

Figure 8:
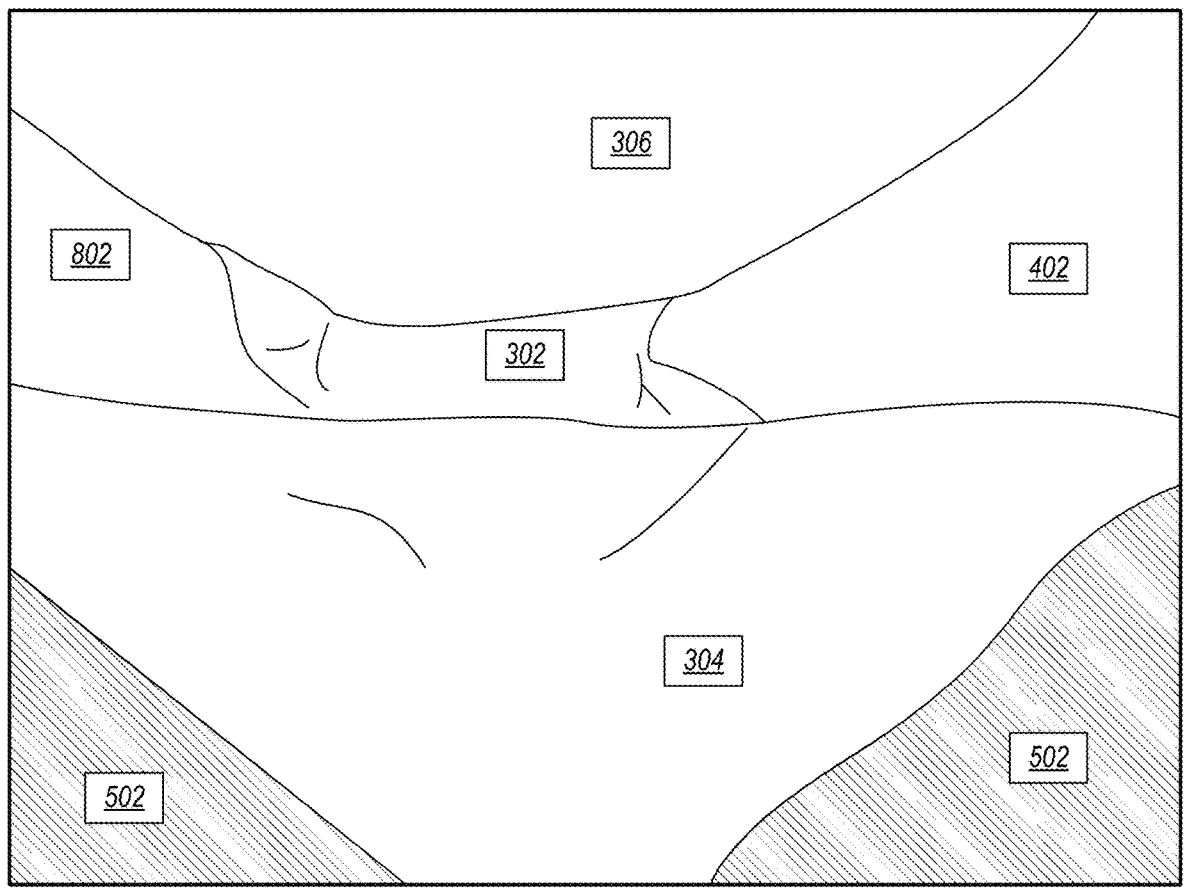
FIG. 8 illustrates an internal view of a nose enclosure of a pack bag in accordance with one or more embodiments.

FIG. 8 illustrates an internal view of the nose enclosure 202 of the pack bag 200 in accordance with one or more embodiments. As shown in FIG. 8, the nose enclosure 202 comprises the nose-end web 302, the top face 304, and the bottom face 306 described above in relation to FIG. 3. In addition, the nose enclosure 202 comprises the sidewall 402 (described above in relation to FIG. 4) and an opposing sidewall 802. Accordingly, the nose enclosure 202 as shown in FIG. 8 forms a receptacle sized and shaped to receive at least a nose-end portion of an antlered big-game animal head.

FIG. 9 illustrates a bottom view of the pack bag 200 in accordance with one or more embodiments. As shown in FIG. 9, the bottom surface of the pack bag 200 includes the bottom face 306 of the nose enclosure 202 and the second bottom flap 406. Although not shown, the bottom surface of the pack bag 200 can comprise (e.g., different from or similar to the loops 208 of FIG. 2) one or more loops for securing the myriad different wrap configurations of the first top flap 204 and the second bottom flap 406 contemplated within the present disclosure.

In alternative embodiments, the bottom surface of the pack bag 200 can include one or more shoulder straps (not shown). For example, in one or more implementations, the pack bag 200 can be carried via shoulder straps such that the pack bag 200 need not integrate with an external backpack or carrying apparatus. In these or other embodiments, the shoulder straps are adjustable to accommodate different carrying heights or shoulder broadness. To prevent tearing at points of attachment between the shoulder straps and the pack bag 200, ripstop material, extra stitching, or other reinforcing methods may be implemented at such points of attachment.

Figure 10:
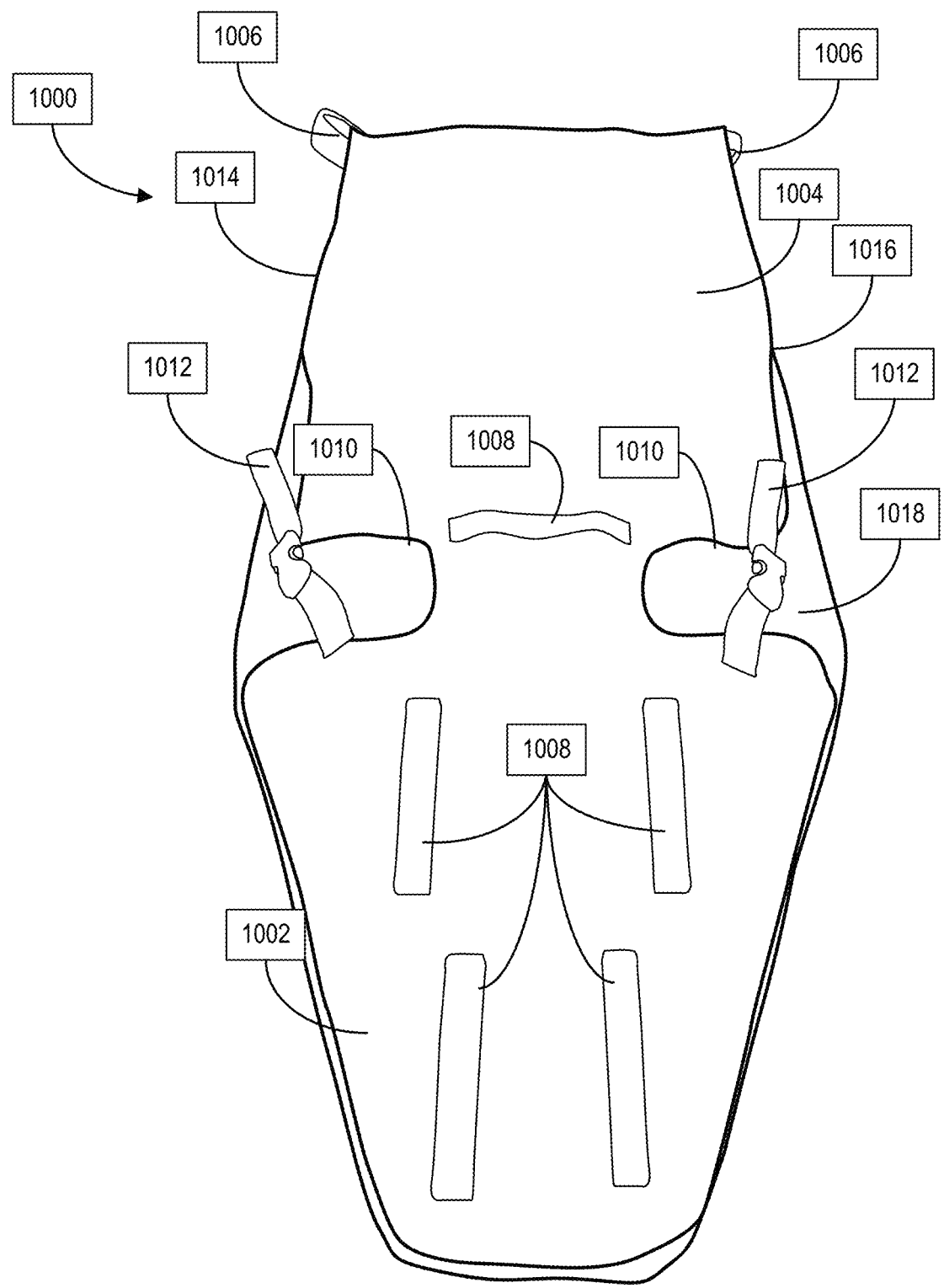
FIG. 10 illustrates a top perspective view of a pack bag in accordance with one or more embodiments.

As mentioned above, mating buckle mechanisms can secure antler bases within edge cutouts of the pack bag 200 to provide a more tight, secure fit to the antlered big-game animal head and/or better distribute material stresses (e.g., for larger antlered big-game animal heads). FIG. 10 illustrates a top perspective view of a pack bag 1000 in accordance with one or more embodiments. As shown, the pack bag 1000 comprises a nose enclosure 1002, a first top flap 1004, fasteners 1006, loops 1008, edge cutouts 1010, and fasteners 1012. The nose enclosure 1002, the first top flap 1004, the fasteners 1006, and the loops 1008 may be the same as or similar to the respective nose enclosure 202, first top flap 204, fasteners 206, and loops 208 described above in relation to FIG. 2 and other figures.

However, different from the pack bag 200, the pack bag 1000 comprises the fasteners 1012 for constraining respective antler bases within the edge cutouts 1010. Unlike smaller antler features like eyeguards or bone growths typical at antler bases of buck deer for instance, other antlered big-game animal heads (e.g., bull elk) comprise large front antler forks that may be less advantageous to wrap over. Accordingly, the edge cutouts 1010 accommodate larger antler bases (including at least front fork antler bases) with a "U" shaped opening defined by the sidewall edges 1014, 1016 of the first top flap 1004. In particular, the fasteners 1012 can adjust the size of the edge cutouts 1010 to accommodate different antler base sizes. By tightening the fasteners 1012 such that the edge cutouts 1010 fit the antler bases of the antlered big-game animal head, the fasteners 1012 can also reduce concentrated material stresses that may otherwise occur at the curved bends forming the "U" shape of the edge cutouts 1010. Although illustrated in a "U" shape, the edge cutouts can be implemented in a variety of shapes, including a rectangle cutout, an oval cutout, or a triangle cutout.

In additional or alternative embodiments, the pack bag 1000 (and/or the pack bag 200) may include a drawstring disposed along an end portion of the pack bag 1000 where the fasteners 1006 are positioned. Additionally or alternatively, the drawstring may be disposed along one or both of the sidewall edges 1014, 1016. By implementing such a drawstring, the pack bag 1000 can secure the antlered big-game animal head inside the pack bag 1000 by compressing portions of the first top flap 1004 and an opposing second bottom flap 1018 together. For example, by pulling the drawstring in one or more implementations, the drawstring can suck in the first top flap 1004 and the opposing second bottom flap 1018 towards the nose enclosure 1002 to impart a compression effect on the antlered big-game animal head.

Figure 11A:
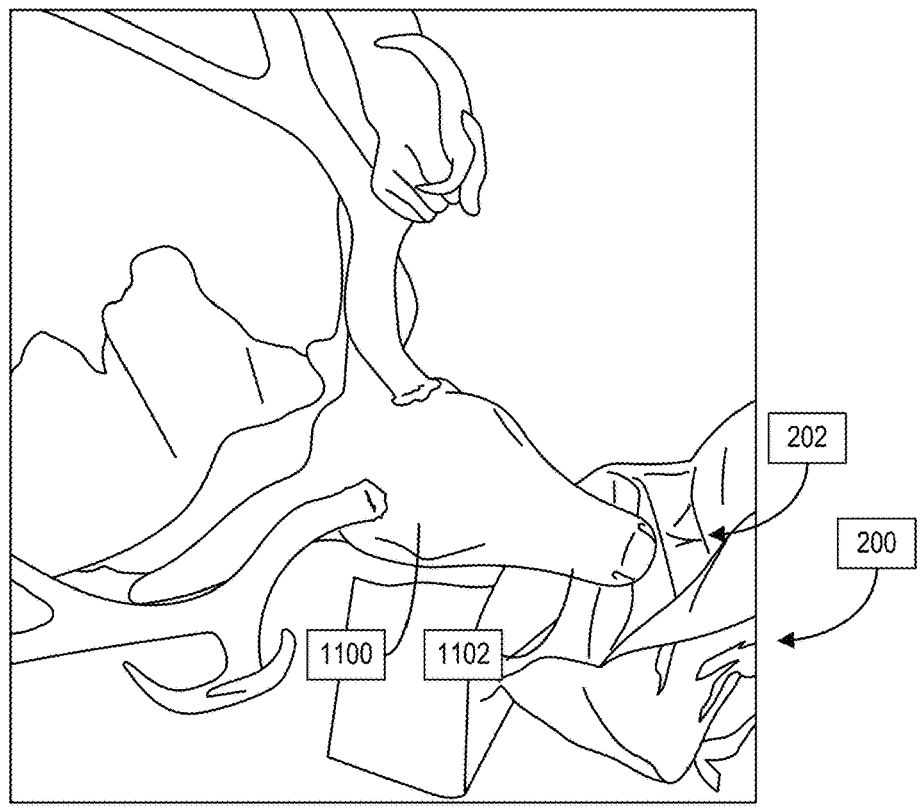
FIGS. 11A-11H illustrate a use-case for implementing a pack bag in accordance with one or more embodiments.
Figure 11B:
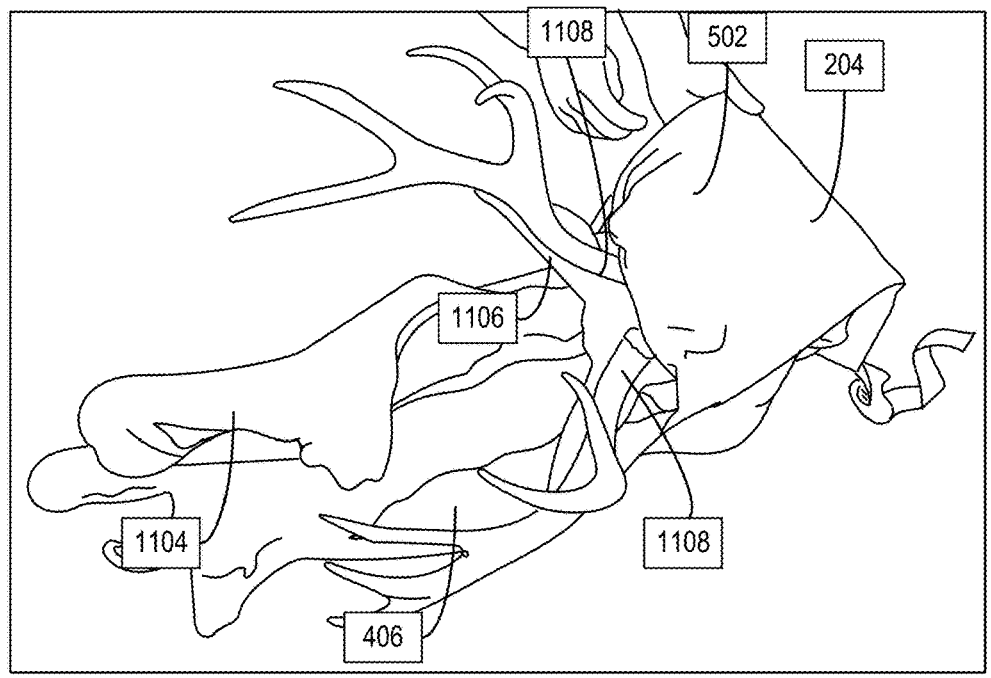
Figure 11C:
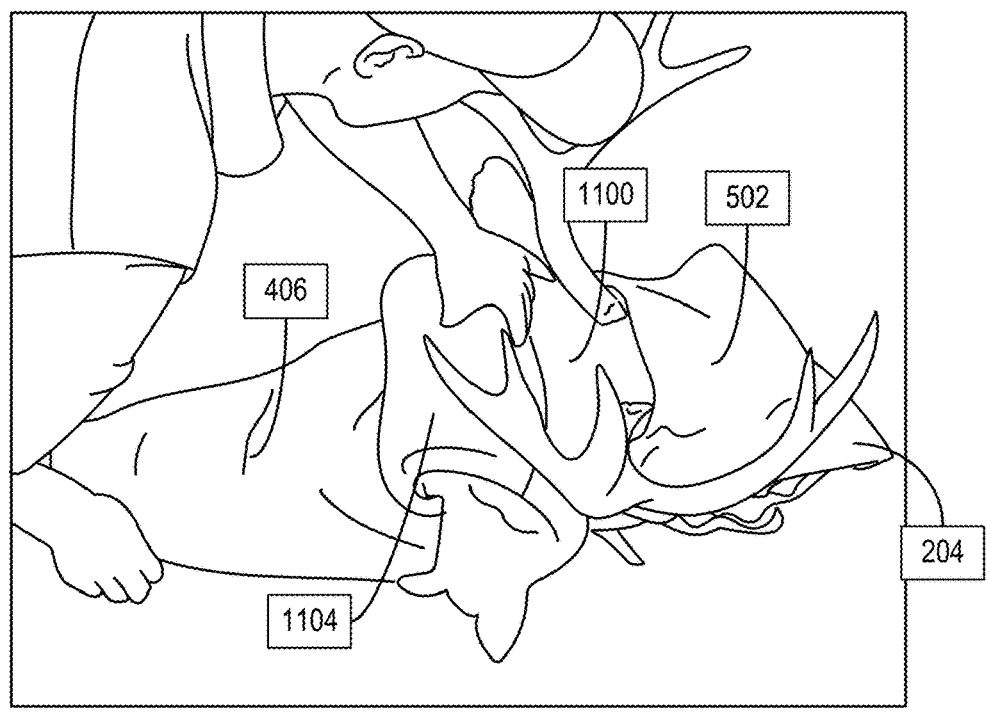
Figure 11D:
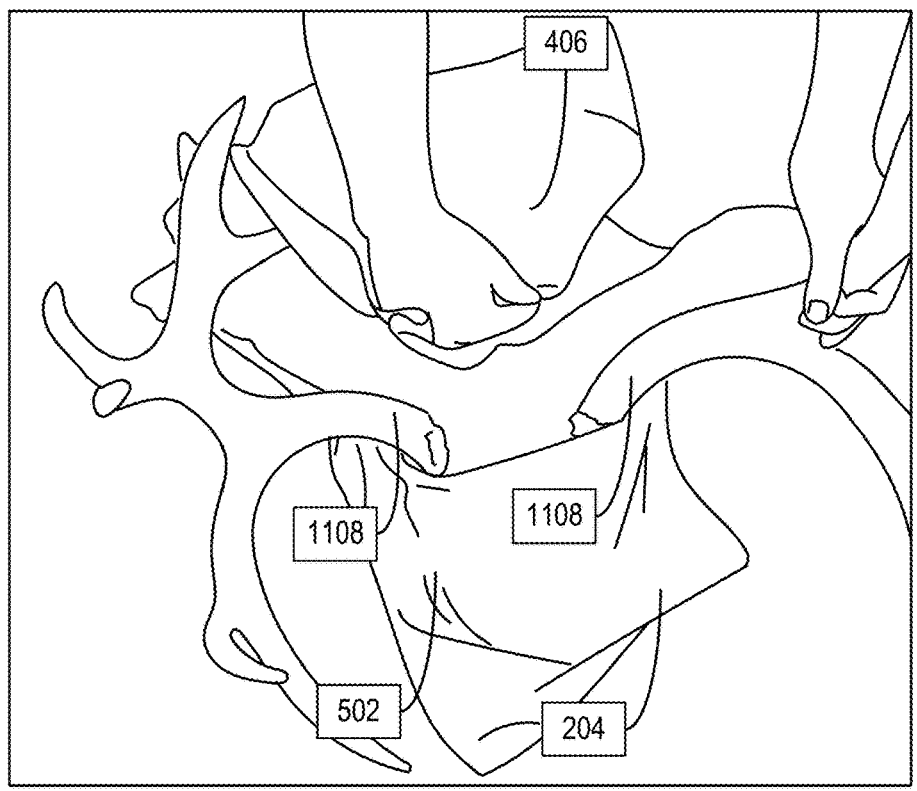

FIGS. 11A-11H illustrate a use-case for implementing the pack bag 200 in accordance with one or more embodiments. In particular, FIGS. 11A-11H show various example steps to secure an antlered big-game animal head 1100 inside the pack bag 200. As shown in FIG. 11A, a nose-end portion 1102 of the antlered big-game animal head 1100 is inserted towards the opening of the nose enclosure 202. Once inserted into the nose enclosure 202 as shown in FIG. 11B, a caped portion 1104 rests on an inside surface of the second bottom flap 406. The first top flap 204 in FIG. 11B is also positioned such that the reinforcement portion 502 can cover one or more eyeguards 1106 when the first top flap 204 is passed between the antler bases 1108. In FIG. 11C, the caped portion 1104 is rolled up to a top portion of the antlered big-game animal head 1100 behind the antler bases 1108. By rolling up the caped portion 1104, the second bottom flap 406 includes sufficient length to subsequently fold over or wrap the caped portion 1104 as shown in FIG. 11D. In other embodiments without the caped portion 1104, the second bottom flap 406 may be folded up between the antler bases 1108 and tucked underneath (or positioned on top of) the first top flap 204 in FIG. 11D.

Figure 11E:
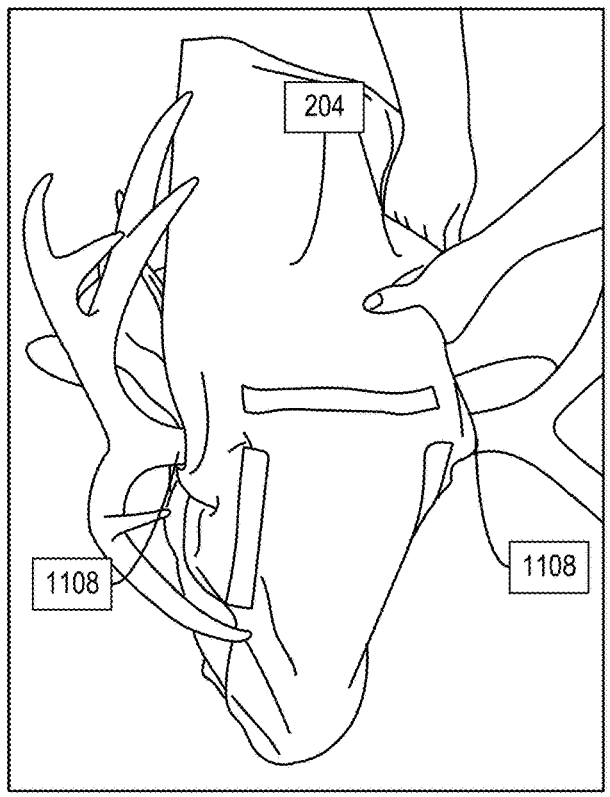
Figure 11F:
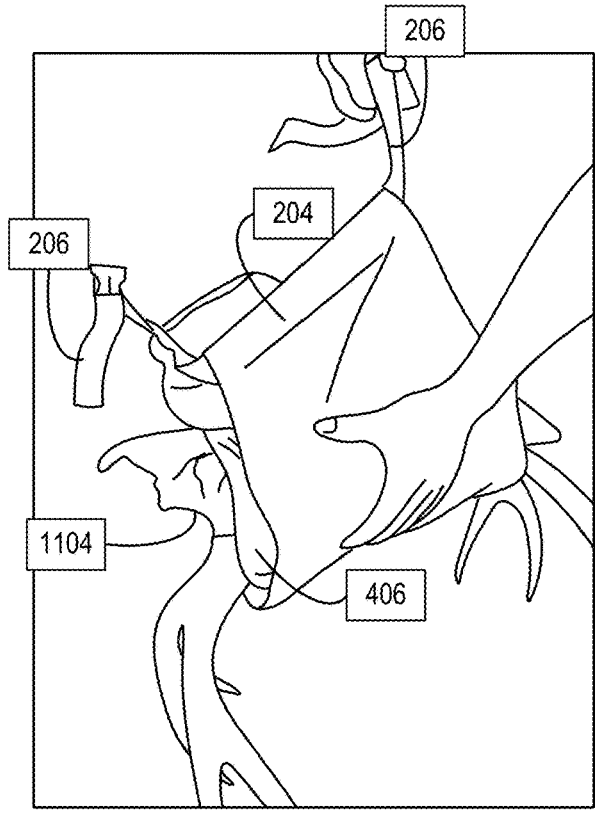
Figure 11G:
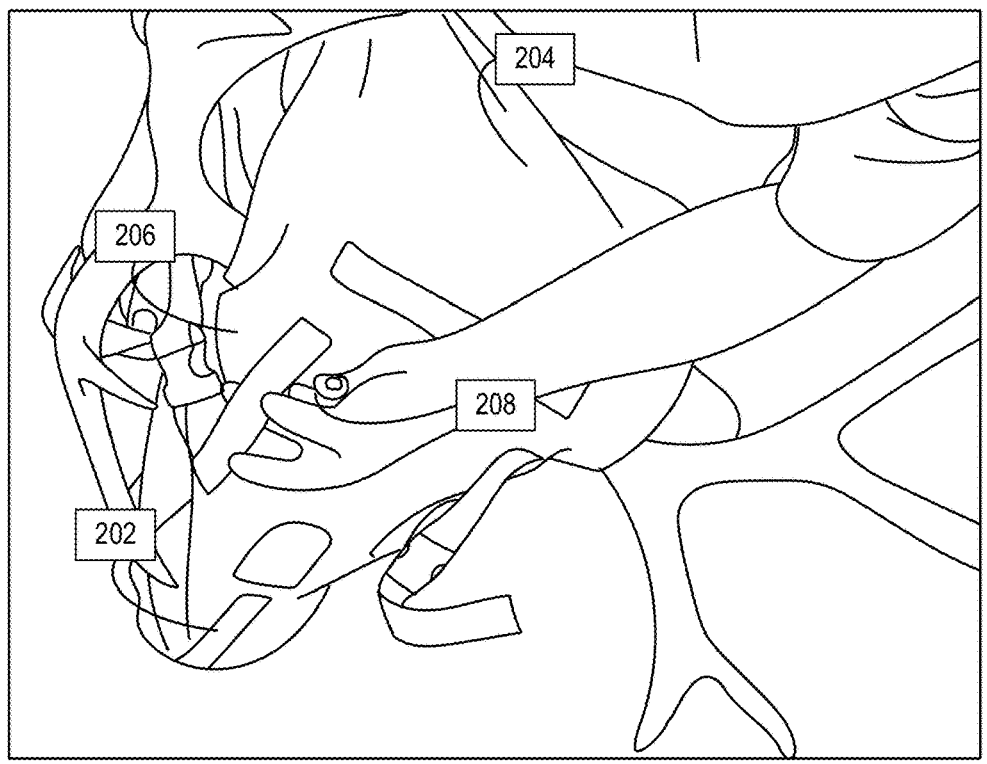
Figure 11H:
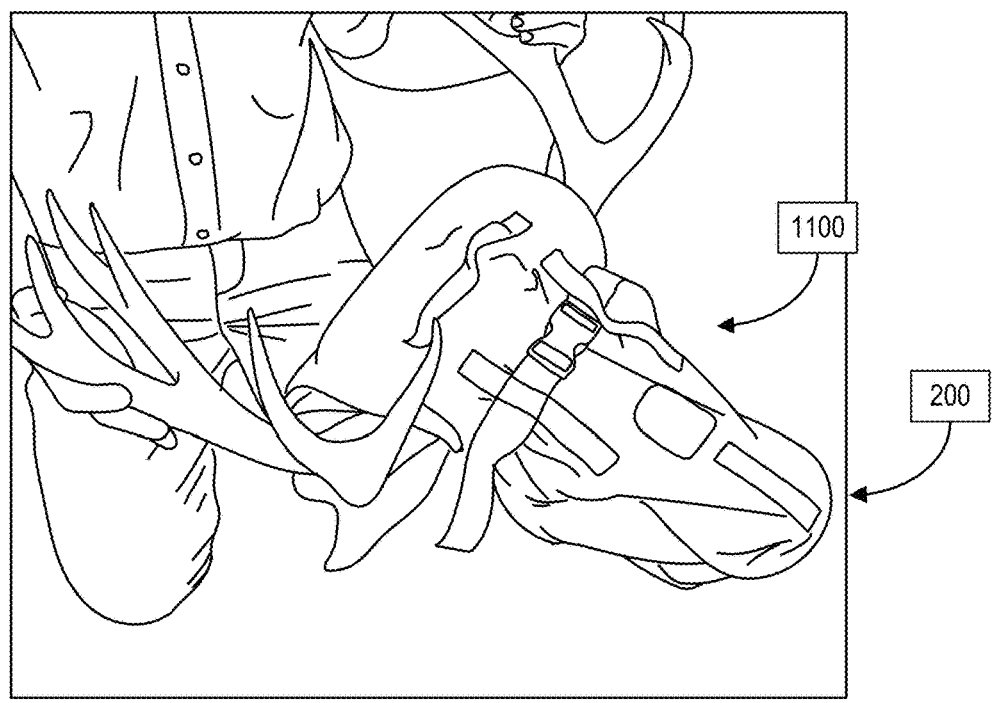

In turn, the first top flap 204 can pass between the antler bases 1108 and over the top of the second bottom flap 406 as shown in FIG. 11E. Once folded over the second bottom flap 406 and the caped portion 1104, the first top flap 204 is positioned on the underside or bottom of the pack bag 200 as depicted in FIG. 11F. When the first top flap 204 is on the underside or bottom of the pack bag 200, the fasteners 206 can wrap around to the front and thread through one or more of the loops 208 disposed on the first top flap 204 and/or the nose enclosure 202 as shown in FIG. 11G. After attaching and tightening the fasteners 206 through the loops 208, the antlered big-game animal head 1100 is secured inside the pack bag 200 and ready for transport as depicted in FIG. 11H.

Figure 12:
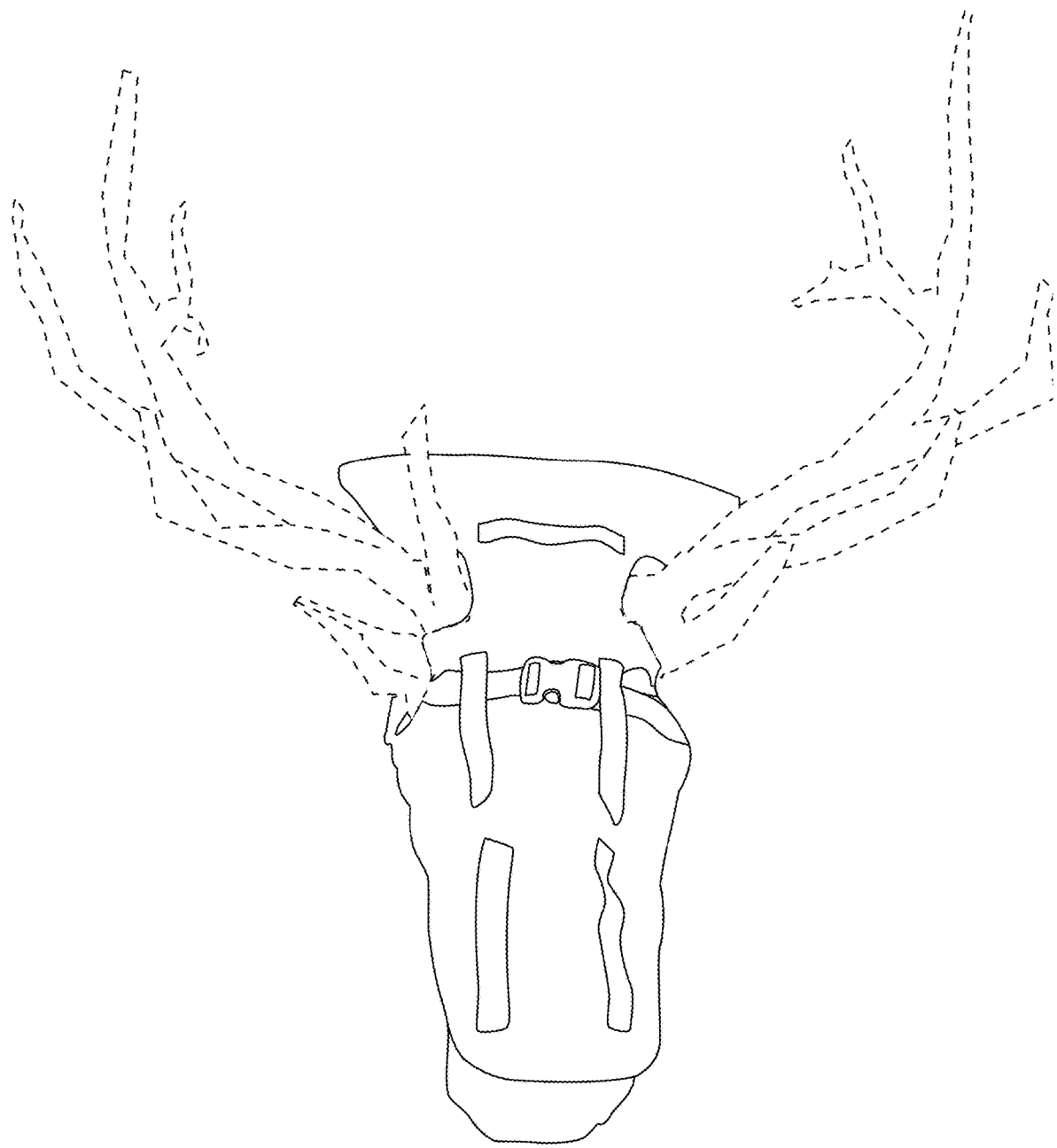
FIGS. 12-21 depict photographic illustrations of one or more pack bags in accordance with certain embodiments.
Figure 13:
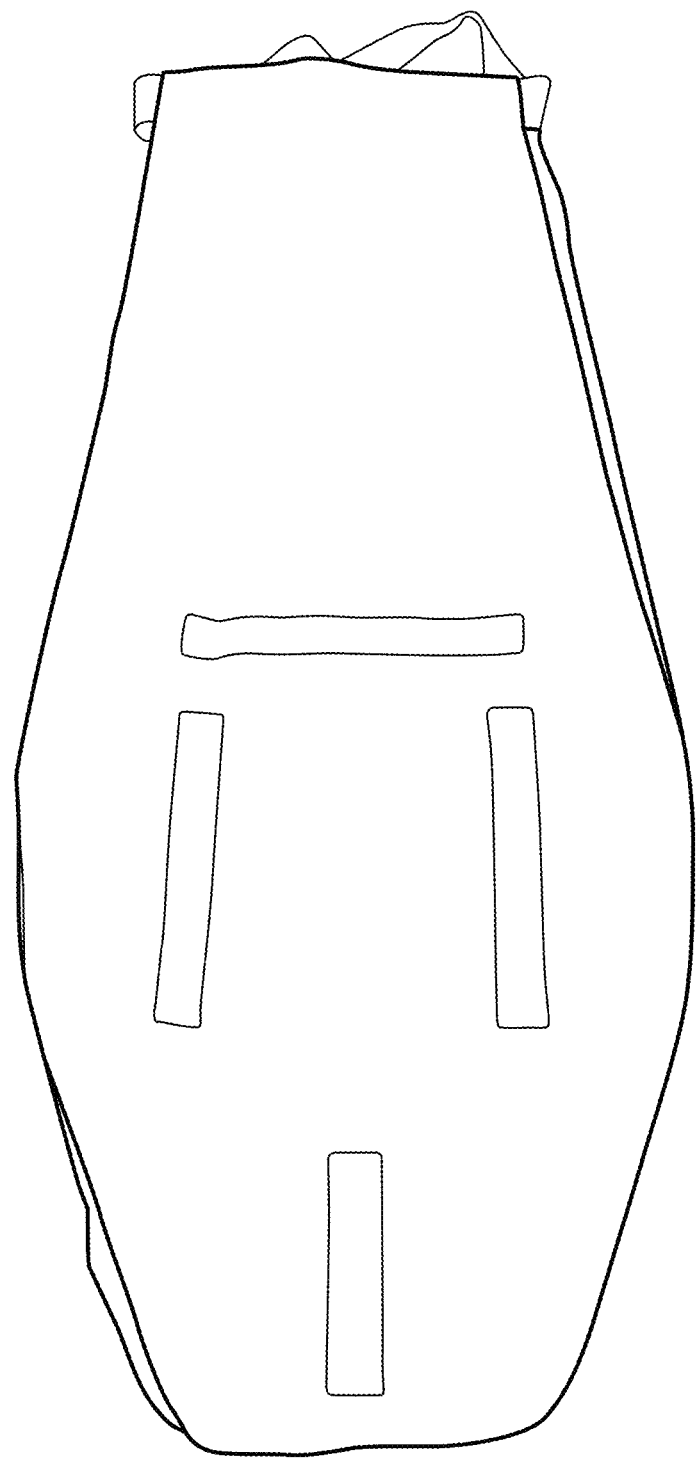
Figure 14:
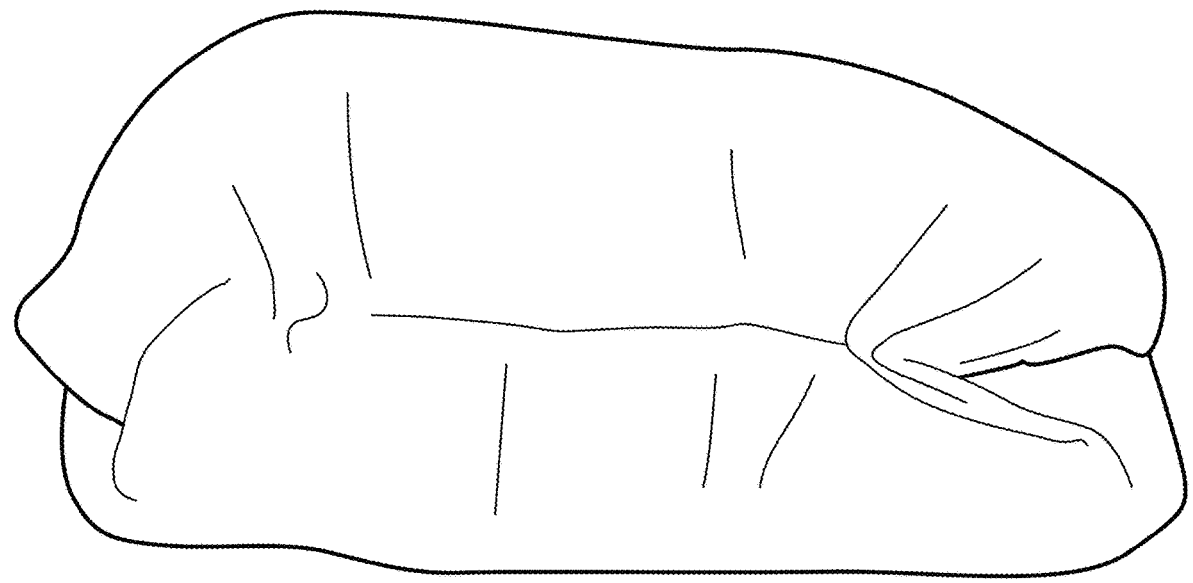
Figure 15:
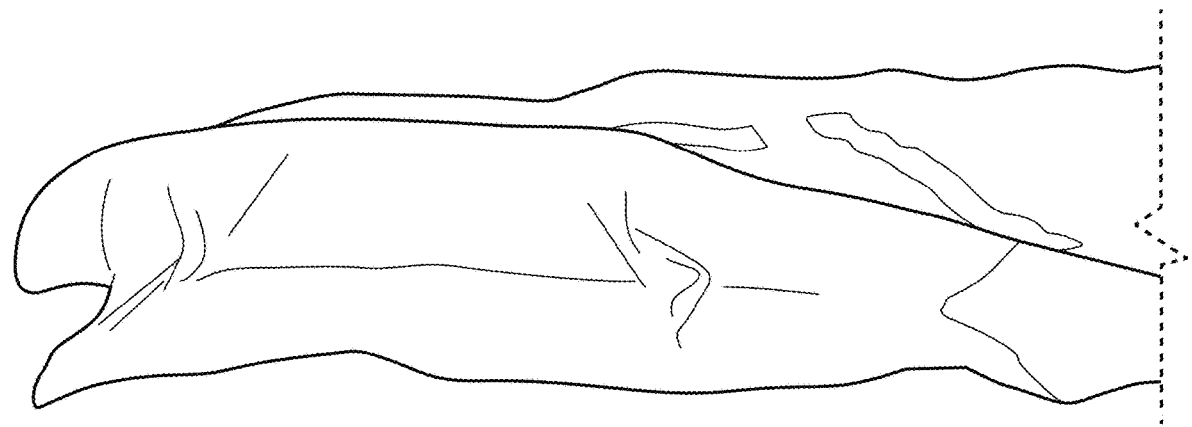

FIGS. 12-21 depict photographic illustrations of one or more pack bags in accordance with certain embodiments of the present disclosure. It will be appreciated that the embodiments depicted in FIGS. 12-21 do not limit the disclosed invention to any particular implementation. Indeed, the illustrations of FIGS. 12-21 are merely example embodiments for implementing the disclosed invention. For example, FIG. 12 illustrates an example environment for implementing a pack bag. FIG. 13 illustrates a top perspective view of a pack bag. In addition, FIG. 14 illustrates a front view of a pack bag, and FIG. 15 illustrates a side perspective view of a pack bag.

Figure 16:
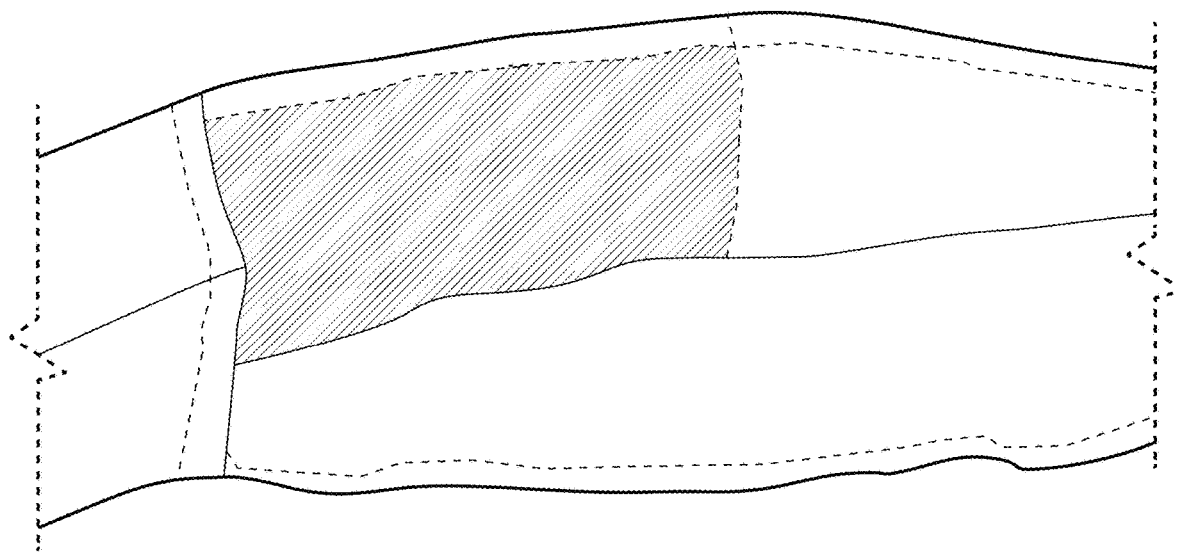
Figure 17:
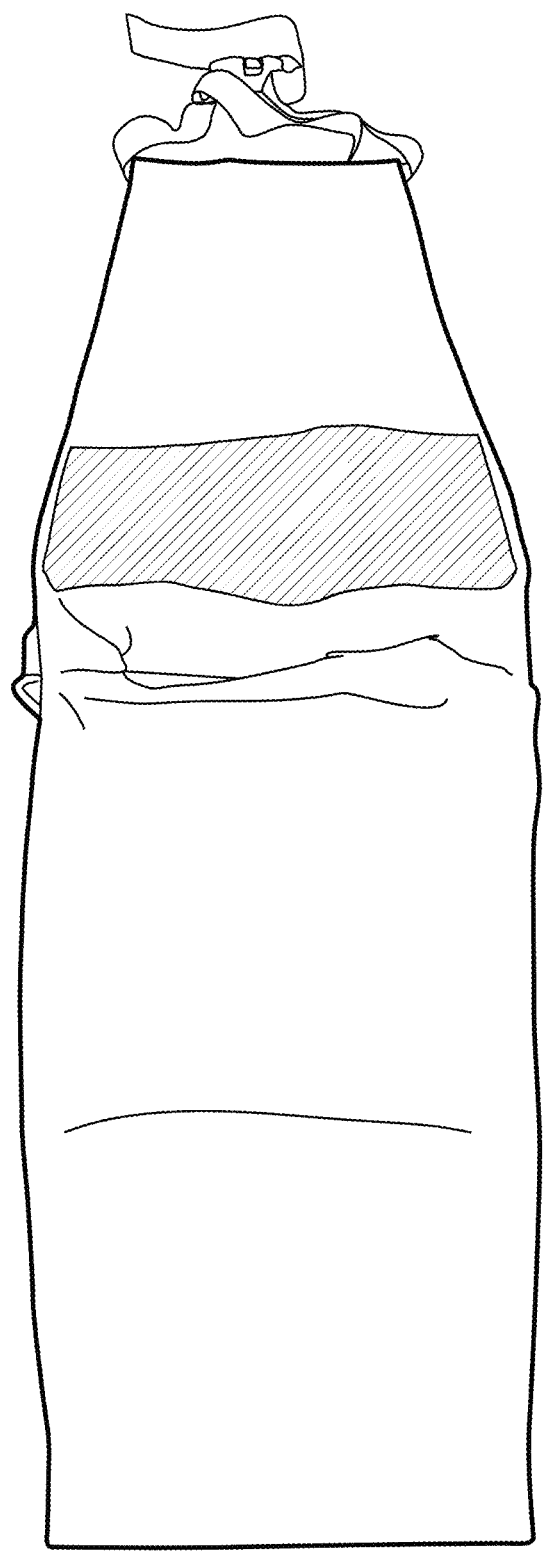
Figure 18:
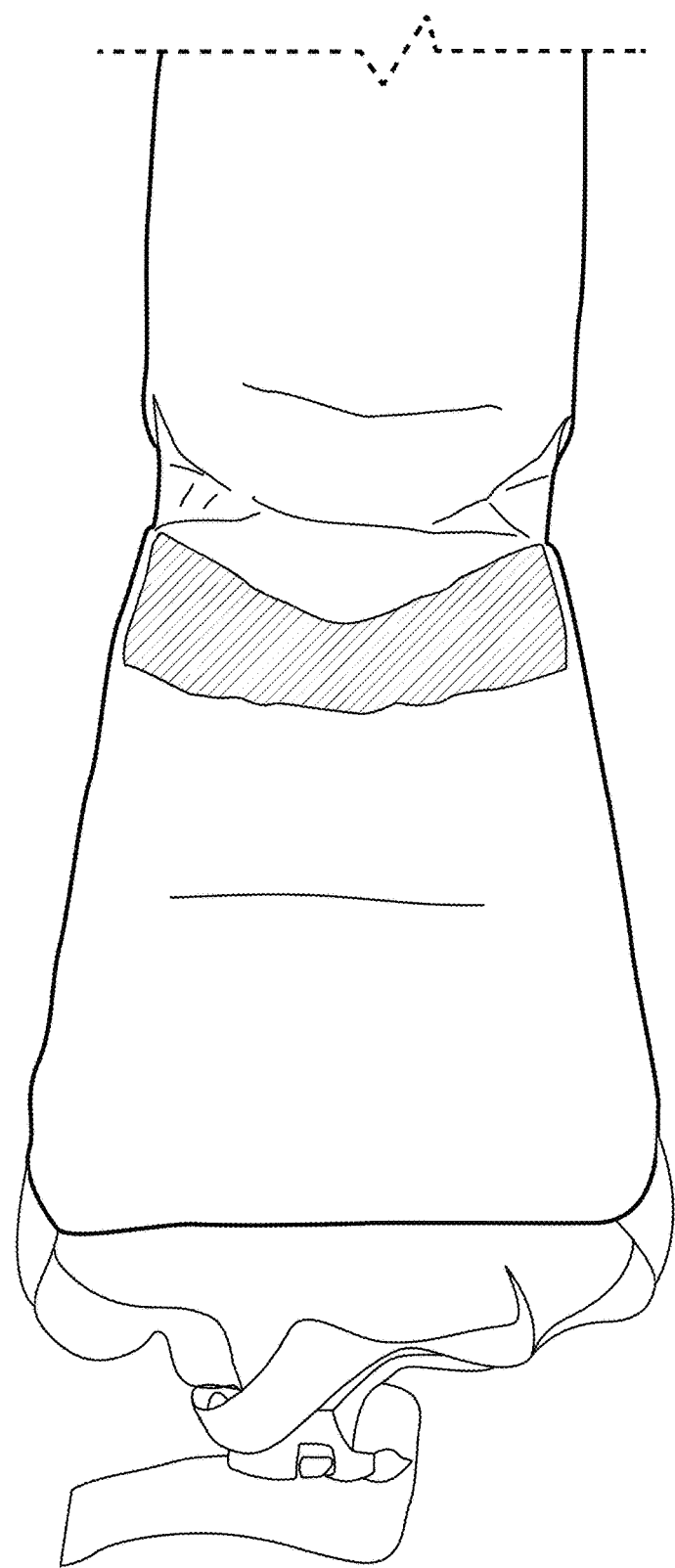
Figure 19:
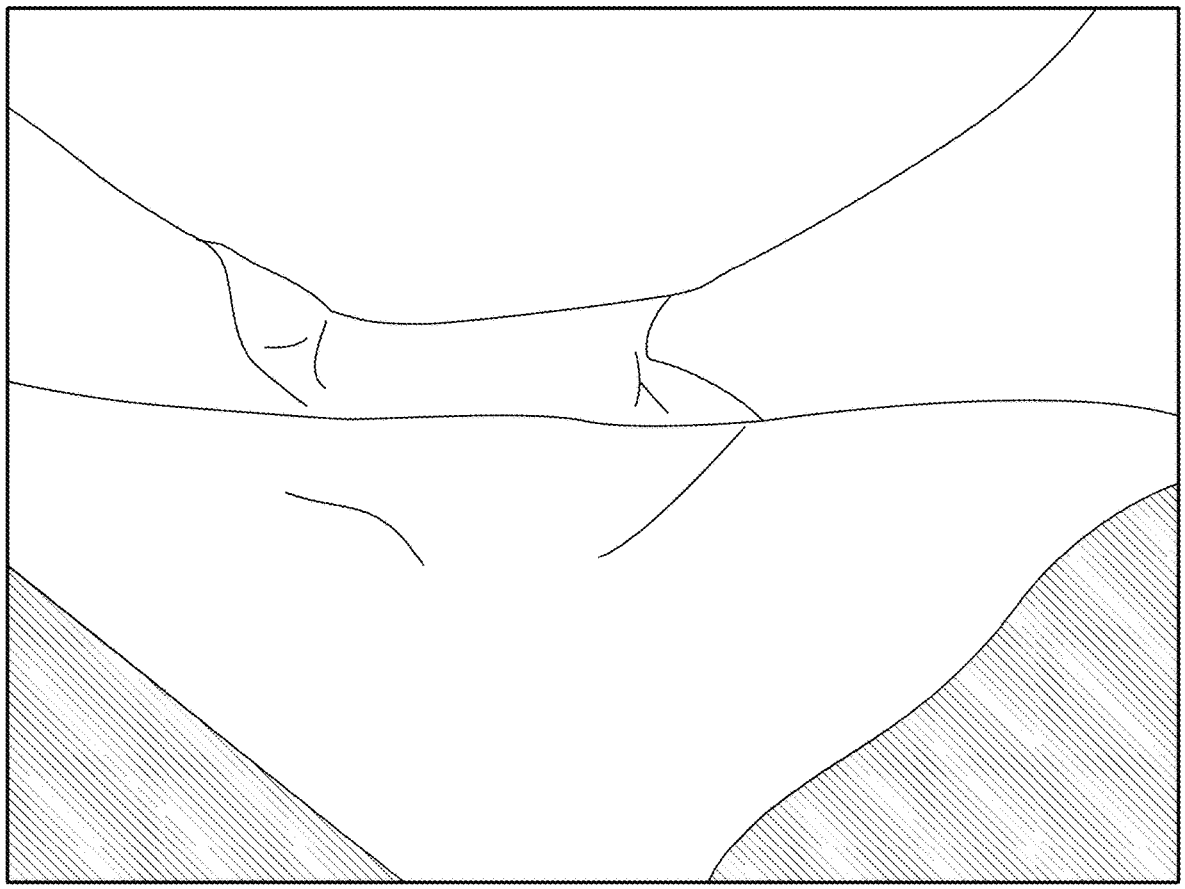
Figure 20:
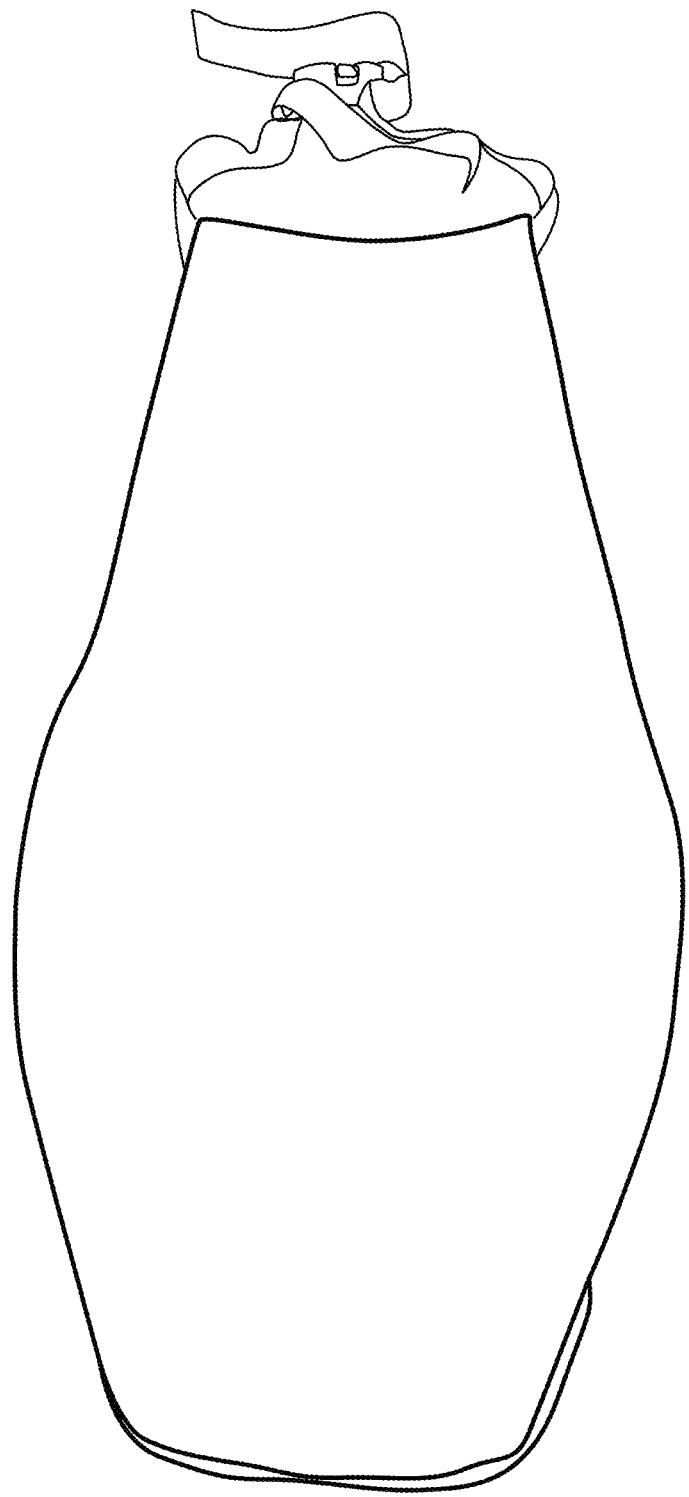
Figure 21:
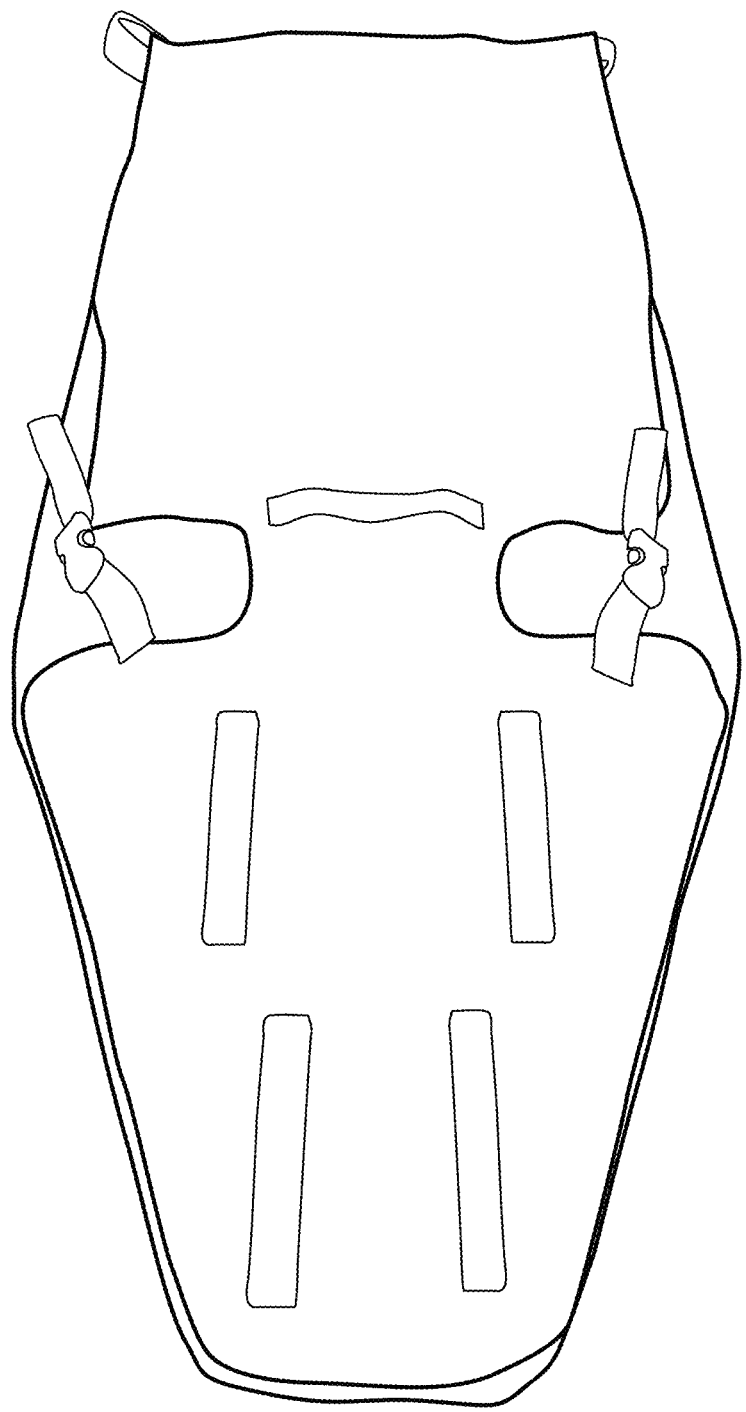

Still further, FIG. 16 illustrates another side perspective view of a pack bag. FIGS. 17-18 illustrate open views of a pack bag. FIG. 19 illustrates an internal view of a nose enclosure of a pack bag, and FIG. 20 illustrates a bottom view of a pack bag. Additionally, FIG. 21 illustrates a top perspective view of a pack bag.

Modifications, additions, or omissions may be made to the embodiments illustrated and described in relation to the figures without departing from the scope of the present disclosure. For example, in some embodiments, one or more fasteners may include additional or alternative fasteners (e.g., zippers, ties, drawstrings, Velcro® seals, etc.).

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A fabric pack bag for transporting at least a head portion of an antlered big-game animal, the fabric pack bag comprising:
   a fabric nose enclosure sized and shaped to receive and conform to a nose-end portion of an antlered big-game animal head;
   a first top flap connected to a top portion of the fabric nose enclosure and a second bottom flap connected to a bottom portion of the fabric nose enclosure forming a continuous foldable fabric surface from the first top flap across the fabric nose enclosure to the second bottom flap, wherein:
   the first top flap is sized and shaped to span continuously from the top portion of the fabric nose enclosure between a first antler base and a second antler base to wrap around the second bottom flap and at least partially cover the second bottom flap and the bottom portion of the fabric nose enclosure at an underside portion of the antlered big-game animal head; and
   the second bottom flap is sized and shaped to span continuously from the bottom portion of the fabric nose enclosure and be stowed in a folded or rolled configuration under the first top flap and against the antlered big-game animal head; and
   one or more fasteners connected to the first top flap such that, when fastened around the antlered big-game animal head from the underside portion to a topside portion of the antlered big-game animal head, the one or more fasteners are sized and shaped to compress the second bottom flap in the folded or rolled configuration and the first top flap wrapped around the second bottom flap against the antlered big-game animal head to conform the first top flap to a size and shape of the antlered big-game animal head.

2. The fabric pack bag of claim 1, wherein the fabric nose enclosure comprises:
   a top face opposing a bottom face;
   opposing sidewalls connecting the top face and the bottom face; and
   a nose-end web joining each of the opposing sidewalls, the top face, and the bottom face, wherein the nose-end web is configured to abut the nose-end portion of the antlered big-game animal head.

3. The fabric pack bag of claim 2, wherein the fabric nose enclosure comprises:
   a draw string to compress or wedge the nose-end portion of the antlered big-game animal head against one or more of the opposing sidewalls, the top face, or the bottom face.

4. The fabric pack bag of claim 1, wherein the fabric nose enclosure comprises one or more loops or eyelets affixed to a top face of the fabric nose enclosure.

5. The fabric pack bag of claim 4, wherein the one or more fasteners are:
   connected to an edge of the first top flap; and
   configured to wrap around the antlered big-game animal head, pass through the one or more loops or eyelets, and fasten together.

6. The fabric pack bag of claim 1, further comprising a reinforcement portion positionally located on the first top flap.

7. The fabric pack bag of claim 1, further comprising sidewall edges that define edge cutouts in the first top flap such that the first top flap wraps at least partially around antler bases of the antlered big-game animal head.

8. The fabric pack bag of claim 7, further comprising additional fasteners that adjust a size of the edge cutouts to accommodate different sizes of antler bases.

9. A fabric pack bag for transporting at least a head portion of an antlered big-game animal, the fabric pack bag comprising:
   a fabric nose enclosure sized and shaped to receive and conform to a nose-end portion of an antlered big-game animal head; and
   a first top flap and a second bottom flap connected to the fabric nose enclosure to form a continuous foldable fabric surface between the first top flap, the fabric nose enclosure, and the second bottom flap, wherein:
   the first top flap is sized and shaped to span from the fabric nose enclosure between a first antler base and a second antler base to wrap around the second bottom flap and a bottom portion of the fabric nose enclosure at an underside portion of the antlered big-game animal head; and
   the second bottom flap is sized and shaped to be stowed in a folded or rolled configuration under the first top flap and against the antlered big-game animal head, such that the second bottom flap is secured between the first top flap and the underside portion of the antlered big-game animal head by the first top flap when the first top flap is wrapped around the second bottom flap.

10. The fabric pack bag of claim 9, further comprising one or more fasteners connected to at least one of the first top flap or the second bottom flap such that, when fastened around the antlered big-game animal head, the one or more fasteners compress both the second bottom flap and the first top flap wrapped around the second bottom flap against the antlered big-game animal head to conform the first top flap to a size and shape of the antlered big-game animal head.

11. The fabric pack bag of claim 9, wherein the fabric nose enclosure comprises:
   a water-resistant material, a water-proof material, an applied coating, or a drainage opening;
   a top face opposing a bottom face;
   opposing sidewalls connecting the top face and the bottom face; and
   a nose-end web joining each of the opposing sidewalls, the top face, and the bottom face.

12. The fabric pack bag of claim 9, further comprising:
   a pair of fasteners connected to an edge of the first top flap; and
   one or more loops or eyelets positioned on the fabric nose enclosure, wherein the pair of fasteners are configured to wrap in opposite directions from the underside portion of the antlered big-game animal ahead head around the antlered big-game animal head to a topside portion of the antlered big-game animal head, pass through the one or more loops or eyelets, and fasten together.

13. The fabric pack bag of claim 9, further comprising a reinforcement portion positionally located on the first top flap, wherein the reinforcement portion comprises a puncture-resistant material comprising at least one of a nylon material, a ripstop material, or a canvas material.

14. The fabric pack bag of claim 9, further comprising:
sidewall edges that define edge cutouts in the first top flap such that the first top flap wraps at least partially around antler bases of the antlered big-game animal head; and
additional fasteners that adjust a size of the edge cutouts to accommodate different sizes of antler bases.

15. A fabric pack bag for transporting at least a head portion of an antlered big-game animal, the fabric pack bag comprising:
a fabric nose enclosure sized and shaped to receive and conform to a nose-end portion of an antlered big-game animal head; and
a flap connected to the fabric nose enclosure, wherein the flap and the fabric nose enclosure form a continuous foldable fabric surface and the flap is sized and shaped to wrap around the antlered big-game animal head to cover a top portion and bottom portion of the antlered big-game animal head and secure the antlered big-game animal within the fabric nose enclosure by:
a top segment of the flap sized and shaped to span continuously from the fabric nose enclosure, to cover a topside area of the antlered big-game animal head, and pass between a first antler base and a second antler base of the antlered big-game animal head;
a bottom segment of the flap sized and shaped to span continuously from the top segment to cover an underside area of the antlered big-game animal head, the bottom segment of the flap forming a continuous foldable fabric surface with the top segment of the flap; and
the bottom segment of the flap engaging one of the fabric nose enclosure or the top segment of the flap via one or more fasteners to compress the flap around the topside area and the underside area of the antlered big-game animal head to conform the flap to a size and shape of the antlered big-game animal head.

16. The fabric pack bag of claim 15, further comprising an additional flap sized and shaped to wrap a caped portion attached to the antlered big-game animal head.

17. The fabric pack bag of claim 16, wherein the bottom segment of the flap is configured to wrap around and at least partially cover the additional flap.

18. The fabric pack bag of claim 15, wherein the one or more fasteners comprise a pair of mating fasteners configured to thread a loop or eyelet positioned on the fabric nose enclosure and compress the top segment of the flap and the bottom segment of the flap against the antlered big-game animal head.

19. The fabric pack bag of claim 15, wherein at least one of the top segment of the flap or the fabric nose enclosure comprises a reflective material, a coated material, or a colored material to increase visibility of the fabric pack bag.

20. The fabric pack bag of claim 15, further comprising one or more loops or eyelets for mounting to a carrying apparatus comprising at least one of a backpack, a saddle, or a vehicle.

* * * * *